(12) United States Patent
Takano et al.

(10) Patent No.: US 7,959,838 B2
(45) Date of Patent: Jun. 14, 2011

(54) EPOXY RESIN FOR PREPREG, PREPREG, FIBER-REINFORCED COMPOSITE MATERIAL AND METHODS FOR PRODUCTION THEREOF

(75) Inventors: Tsuneo Takano, Toyohashi (JP); Akitada Yanase, Toyohashi (JP); Tadashi Sakai, Tokyo (JP); Kiharu Numata, Toyohashi (JP); Akihiro Ito, Toyohashi (JP); Masato Taguchi, Tokyo (JP); Junichi Muramatsu, Toyohashi (JP); Kazuya Goto, Irvine, CA (US); Kazuki Koga, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 41 days.

(21) Appl. No.: 12/056,320

(22) Filed: Mar. 27, 2008

(65) Prior Publication Data
US 2008/0185757 A1 Aug. 7, 2008

Related U.S. Application Data

(62) Division of application No. 10/536,275, filed as application No. PCT/JP03/15276 on Nov. 28, 2003, now Pat. No. 7,591,973.

(30) Foreign Application Priority Data

Nov. 28, 2002 (JP) ................. 2002-346198
Nov. 29, 2002 (JP) ................. 2002-347650
Dec. 5, 2002 (JP) ................. 2002-353760
Dec. 13, 2002 (JP) ................. 2002-362519

(51) Int. Cl.
*B29C 67/00* (2006.01)

(52) U.S. Cl. ............ 264/136; 264/137; 264/258
(58) Field of Classification Search ............ 264/136, 264/137, 258
See application file for complete search history.

(56) References Cited

U.S. PATENT DOCUMENTS 3,184,527 A * 5/1965 Fischer ............ 264/255
(Continued)

FOREIGN PATENT DOCUMENTS

CN 1050698 A 4/1991
(Continued)

OTHER PUBLICATIONS

U.S. Appl. No. 12/056,309, filed Mar. 27, 2008, Takano, et al.
(Continued)

*Primary Examiner* — Khanh Nguyen
*Assistant Examiner* — Saeed M Huda
(74) *Attorney, Agent, or Firm* — Oblon, Spivak, McClelland, Maier & Neustadt, L.L.P.

(57) ABSTRACT

An epoxy resin composition suitably used for a prepreg which can complete curing in a short time even at a low temperature and secure a sufficient usable period under preservation at room temperature, in comparison with conventional epoxy resin compositions. An epoxy resin composition comprising at least one of an epoxy resin, an amine compound having at least one sulfur atom in the molecule thereof, and a reaction product of an epoxy resin and an amine compound having at least one sulfur atom in the molecule thereof, and an amine compound having at least one sulfur atom in the molecule thereof, and a urea compound and a dicyandiamide, wherein each of the contents of the sulfur atom and the urea compound in the epoxy resin composition is respectively 0.2 to 7% by mass and 1 to 15% by mass.

6 Claims, 2 Drawing Sheets

U.S. PATENT DOCUMENTS

| | | | |
|---|---|---|---|
| 3,901,833 | A | 8/1975 | Flynn |
| 4,332,767 | A | 6/1982 | Kitanaka et al. |
| 4,532,169 | A * | 7/1985 | Carley .................. 428/109 |
| 4,607,069 | A | 8/1986 | Tesch et al. |
| 4,784,899 | A * | 11/1988 | Ono et al. ................ 442/281 |
| 4,859,533 | A | 8/1989 | Seiya et al. |
| 4,868,050 | A | 9/1989 | Tanaka et al. |
| 4,956,411 | A | 9/1990 | Tada et al. |
| 5,100,935 | A | 3/1992 | Iseler et al. |
| 5,396,932 | A | 3/1995 | Homma et al. |
| 5,589,523 | A | 12/1996 | Sawaoka et al. |
| 5,911,932 | A | 6/1999 | Dyksterhouse |
| 6,054,177 | A | 4/2000 | Endoh et al. |
| 6,103,150 | A | 8/2000 | McDougall |
| 6,287,696 | B1 | 9/2001 | Noda et al. |
| 6,399,199 | B1 | 6/2002 | Fujino et al. |
| 6,649,109 | B1 | 11/2003 | Renault |
| 6,838,148 | B1 | 1/2005 | Ehnert et al. |
| 2002/0007022 | A1 | 1/2002 | Oosedo et al. |
| 2003/0082385 | A1 | 5/2003 | Li et al. |
| 2006/0035088 | A1 | 2/2006 | Takano et al. |
| 2006/0035548 | A1 | 2/2006 | Goto et al. |
| 2008/0185753 | A1 | 8/2008 | Takano et al. |
| 2008/0187718 | A1 | 8/2008 | Takano et al. |

FOREIGN PATENT DOCUMENTS

| | | |
|---|---|---|
| CN | 1242792 A | 1/2000 |
| DE | 2 232 913 | 1/1973 |
| DE | 691 31 590 T2 | 1/2000 |
| DE | 199 49 318 A1 | 3/2001 |
| DE | 100 58 431 A1 | 10/2001 |
| EP | 1 275 674 A1 | 1/2003 |
| EP | 1 535 726 A1 | 6/2005 |
| GB | 1 393 534 | 5/1975 |
| JP | 51-151767 | 12/1976 |
| JP | 56-56699 | 5/1981 |
| JP | 58-83031 | 5/1983 |
| JP | 59-207919 | 11/1984 |
| JP | 59-207920 | 11/1984 |
| JP | 61-211005 | 9/1986 |
| JP | 1-287130 | 11/1989 |
| JP | 2-151623 | 6/1990 |
| JP | 4-151215 | 5/1992 |
| JP | 4-259515 | 9/1992 |
| JP | 5-169582 | 7/1993 |
| JP | 6-166765 | 6/1994 |
| JP | 06-286008 | 10/1994 |
| JP | 7-2975 | 1/1995 |
| JP | 7-70406 | 3/1995 |
| JP | 7-70409 | 3/1995 |
| JP | 7-88871 | 4/1995 |
| JP | 07-118988 | 5/1995 |
| JP | 7-323432 | 12/1995 |
| JP | 8-85112 | 4/1996 |
| JP | 9-208838 | 8/1997 |
| JP | 9-225955 | 9/1997 |
| JP | 10-095048 | 4/1998 |
| JP | 10-128778 | 5/1998 |
| JP | 10-330513 | 12/1998 |
| JP | 11-43546 | 2/1999 |
| JP | 11-171942 | 6/1999 |
| JP | 2000-17090 | 1/2000 |
| JP | 2000-86784 | 3/2000 |
| JP | 2000-212307 | 8/2000 |
| JP | 2000-301534 | 10/2000 |
| JP | 2001-322179 | 11/2001 |
| JP | 2002-159613 | 6/2002 |
| JP | 2002-283389 | 10/2002 |
| WO | WO 93/03920 | 3/1993 |
| WO | WO0196095 | * 12/2001 |

OTHER PUBLICATIONS

Sigma-Aldrich, "Material Safety Data Sheet", Substance Name—3-(3,4—Dichlorophenyl)—1, 1-Dimethyl Urea, (CAS # 330-54-1) (2005), pp. 1-7.

Pyrofilm™-Typical Properties of Carbon Fiber, provided by Grafil, Inc. (Mar. 2010).

Office Action mailed Oct. 7, 2009, in co-pending U.S. Appl. No. 12/056,309.

Office Action mailed May 19, 2010, in co-pending U.S. Appl. No. 12/056,309.

Office Action mailed Oct. 13, 2009, in co-pending U.S. Appl. No. 12/056,312.

Office Action mailed Jun. 24, 2009, in co-pending U.S. Appl. No. 12/056,315.

Office Action mailed Jan. 25, 2010, in co-pending U.S. Appl. No. 12/056,315.

Office Action mailed Apr. 23, 2010, in co-pending U.S. Appl. No. 12/056,315.

Information Statement issued Jul. 21, 2009, in Japanese Patent Application No. 2005-510923 (with English translation).

Decision of Rejection issued Mar. 9, 2010, in Japanese Patent Application No. 2005-510923.

Office Action issued Mar. 9, 2010, in Japan Patent Application No. 2005-510293 (with English-language Translation).

* cited by examiner

EPOXY RESIN FOR PREPREG, PREPREG, FIBER-REINFORCED COMPOSITE MATERIAL AND METHODS FOR PRODUCTION THEREOF

This is a divisional application of U.S. application Ser. No. 10/536,275, filed May 25, 2005, which is a 371 of PCT/JP03/15276 filed on Nov. 28, 2003.

TECHNICAL FIELD

The present invention relates to an epoxy resin composition, a thermosetting resin composition, a prepreg, a fiber-reinforced composite material, and methods for producing thereof. The epoxy resin of the present invention is an epoxy resin composition especially suitable for use for a prepreg, and can be cured in a short time at a relatively low temperature. Therefore, by using the epoxy resin composition, a superior prepreg which is excellent in mechanical property and able to be held for a long period of time at room temperature, can be obtained. The thermosetting resin composition of the present invention is suitable for high speed molding, and can form molded fiber-reinforced composite materials (hereinafter occasionally referred to as FRP in the specification) developed with high mechanical characteristics. Consequently, by using the composition, it is possible to obtain a superior prepreg and fiber-reinforced composite material product. The superior prepreg provided by the present invention can be suitably used to obtain plates of fiber-reinforced composite materials which are employed as shell plates for transport machinery and industrial apparatuses. The present invention also provides a method for easily producing FRP which is of high strength and excellent in design thereof, especially a method for producing in a short time by applying a compression molding method.

The present invention is based on Japanese Patent Applications No. Hei-14-346198, No. Hei-14-347650, No. Hei-14-353760 and No. Hei-14-362519, and includes the contents thereof.

BACKGROUND ART

FRP is widely applied by utilizing its characteristics of light weight, high strength and high rigidity, in fields ranging from sports and leisure applications such as fishing rods, golf club shafts and the like, to industrial applications such as automobiles, aircraft and the like.

As a method for producing FRP, suitable is a method using a prepreg as an intermediate material which is obtained by impregnating resin into a reinforcer which includes filaments such as reinforced fiber and the like, as the amount of reinforced fiber contained in the prepreg is controllable and capable of being designed at a relatively high ratio.

The specific method to obtain FRP from prepreg includes a method using an autoclave as disclosed in Japanese Unexamined Patent Application, First Publication, No. Hei-10-128778, a method using a vacuum bag as disclosed in Japanese Unexamined Patent Application, First Publication, No. 2002-159613, and a compression molding method as disclosed in Japanese Unexamined Patent Application, First Publication, No. Hei-10-95048.

Any of these methods, however, required time of about 2 to 6 hours under a condition of about 160° C. until completing curing processing such as from layering the prepreg, subjecting the layered prepreg to the intended shape to thermally cure; that is, high temperatures and long treatment times are required.

In order to make mass production of products possible, a molding is desired which can be carried out at a relatively low temperature in a range of about 100 to 130° C. in a short time ranging from a few minutes to several tens of minutes. A method to achieve the purpose includes use of epoxy resin compositions which commence curing thereof with little thermal energy, to shorten the time until the epoxy resin compositions complete curing thereof. However, if reaction activity is too high, this is dangerous due to the curing reaction running out of control. On the other hand, if conventionally used curing agents are applied, the increased amount of agents used may decrease mechanical properties. Moreover, such an epoxy resin composition is short in usable period thereof and may even cure in a few days preservation at room temperature. Thus, development of an epoxy resin composition having preferable reactivity, is expected.

From the consideration points of conditions suitably required for a prepreg, the following conditions are mentioned.

To be excellent in handling ability such as favorable tackiness (degree of stickiness) at around room temperature, appropriate draping ability (flexibility) and the like.

To keep handling ability for a long time, that is, to achieve long life at around room temperature, and a molded FRP to be excellent in mechanical property and thermal property thereof.

Prepregs which impregnate matrix resin such as an epoxy resin composition and the like in reinforced fibers, and are widely used as an intermediate material of fiber-reinforced composite materials can be used in various fields. Excellence in molding ability thereof is particularly required when being used for industrial applications described above.

At present, conventional prepregs need about 1 hour for thermal curing, therefore as aforementioned, if including times for temperature rising and lowering, even though dependent on conditions, the entire required time is about 2 or 3 to 6 hours in one cycle. This is an extremely long time, and one of the reasons for increased molding costs.

However, if required heating times were shortened, problems such as setting molding temperature extremely high may arise because life of the prepreg at around room temperature would be shortened. Development of a thermosetting resin composition which provides excellent properties for a prepreg, is desired.

SMC, properties of prepregs, and FRP plates are described below.

As materials used for FRP other than the prepregs, molding materials such as a sheet molding compound (hereinafter referred to as SMC) and the like are often used for molding. In producing FRP, employment of a prepreg including a substantially continuous reinforced fiber drawn and arranged in one direction (hereinafter referred to as UD prepreg), a woven prepreg or the like, is advantageous particularly in terms of strength of FRP, in comparison to employing SMC which requires much improvement as mentioned hereinafter.

The prepregs currently used, however, require additional improvements to obtain further excellent FRP with high efficiency.

As FRP plates being excellent in corrosion resistance, applications have been tried for shell plates of transport machinery including automobiles and various industrial apparatuses. For example, an FRP plate called SMC is widely used in shell plates such as bonnets, fenders and the like for automobiles.

SMC (for example, refer to Japanese Unexamined Patent Application, First Publication, No. Hei-6-286008) is a slurry like intermediate material wherein a reinforced fiber of a staple fiber of a carbon fiber or a glass fiber is mixed, with polyester resins and the like. The intermediate material is subjected to heating and to high pressure pressing (usually above 50 kg/cm² or more) in a mold to shape base plates for a shell plate. Then, the base plates are ground by sandpaper or a file to make surfaces thereof flat and smooth, followed by color painting to form, for example, FRP shell plates for automobiles.

Since the shell plate of SMC includes reinforced fiber of staple fiber (non-continuous fiber), rigidity thereof is less than in the case of continuous fiber employed (not only because of reinforced fiber being staple fiber, but also 70 GPa of elastic modulus of glass being one-third of 210 GPa of elastic modulus of steel). Consequently, plate thickness of the shell plate becomes thicker than that of a metal shell plate, resulting in that the weight is not necessarily lighter than that of a metal shell plate; and if weight could be saved, the savings are often restricted to a small range. Furthermore, the shell plate made of SMC is easily perforated by local impact such as being struck by flying objects because of SMC employing non-continuous fiber; the local impact being important as regards required strength characteristics to the shell plate besides rigidity. Therefore, shell plates used for outdoors such as for transport machinery, must employ protection for impact resistance by, for example, an increase in thickness thereof, layering rubber or the like. Thus, a shell plate made of SMC does not work as a light weight shell plate able to replace a metal shell plate in terms of weight, that is, is not an environmentally friendly shell plate for transport machinery.

The most common reason for shell plates made of SMC being practically used, is that the base plate thereof before grinding treatment obtains nearly uniform surface quality due to the staple fiber thereof randomly (almost uniformly) distributed. When continuous fiber is used, due to unevenness or thickness irregularity caused by non-uniform fiber distribution, fiber meandering or undulating, crossing over of fibers themselves, or the like; unevenness of the base plate surface becomes larger than in the case of using a staple fiber. Therefore, in this case, the following problems arise:

1) Heavy labor necessary for grinding work
2) Grinding continuous reinforced fibers off in grinding work, resulting in mechanical and functional properties as a shell plate being further reduced.

On the other hand, it is preferable that continuous fiber can provide FRP having higher properties in terms of rigidity and strength, and lightness in weight. Although forms of continuous fiber are of a great variety such as unidirectional prepreg, fabric, three dimensional fabric and the like, none of them have yet to be implemented.

Alternatively, members including continuous fiber of reinforced fiber have been studied. Examples thereof include a member obtained by which prepregs including a unidirectionally continuous fiber and a resin are layered on a mold, and then it is cured by autoclave and the like; and a member obtained by which a pre-form such as fabric and the like is set in a mold, and then resin is injected thereto, that is, RTM (resin transfer molding) and the like. However, because of the intrinsic problems of continuous fiber, that is, unevenness or thickness irregularity due to fiber meandering or undulating, crossing over of fibers themselves; surface quality of the resultant member is low, therefore these have not yet been practically applied to shell plates of transport machinery such as automobiles and the like.

To improve surface quality, a coating method called gel coating is applied. The gel coating method (refer to Japanese Unexamined Patent Application, First Publication, No. Hei-11-171942) is a method wherein resin materials such as polyesters and the like can be used on the surface of a shell plate, are previously coated on the inner face of a mold to form a coating layer, followed by disposing a base material of reinforced fiber on the coating and then closing the mold; thereafter, resins are injected to cure, followed by stripping off to transfer the coating on a surface of the FRP shell plate. This method is industrially advantageous due to elimination of surface grinding work or painting. However, when being thermally cured, deformation such as warpage of the whole molding arises due to the difference in coefficients of linear expansion between the FRP and the gel coating layer. Therefore, this method is not suitable for a shell plate which requires accuracy, and is also not suitable for a shell plate due to development of cracks or wrinkles on the gel coating layer.

Furthermore, because the surface of FRP including continuous fiber as a reinforced fiber has unevenness, a thickness of the gel coating layer is at least 200 microns which is thicker than painting film when being painted. This results not only in increased weight but also the presence of drawbacks such as the gel coating layer cracking or exfoliating when the shell plate is distorted by outer forces; therefore, it is not suitable for a shell plate.

The cracks or exfoliation of the gel coating layer, in the case of the gel coating layer FRP used outdoors, may negate the advantages of FRP such as lightness in weight and durability due to water penetration into the FRP such as rain water and the like. Moreover, the gel coating is restricted in color selection in comparison to painting, and it is impossible to express appearance with a metallic feeling or fashionability. This causes problems in that the gel coating cannot be applied to a shell plate which requires matching color thereof to that of other members, such as a shell plate for automobiles, because of the reducing value of the whole product caused by color mismatching. There may be a possibility of providing painting on the gel coating layer, this case causes another penalty such as further increases in weight and/or cost.

Another attempt to improve surface quality has been studied by adjusting a cover factor of a carbon fiber fabric used as reinforced fiber (refer to Japanese Unexamined Patent Application, First Publication, No. 2001-322179).

However, it is difficult to keep the cover factor in a preferable range, because the woven carbon fiber passing through various processes after being woven such as processing to an intermediate material, process of cutting, layering and pre-forming, and molding to FRP. Although the cover factor can be kept in a preferable range by restricting movement of a carbon fiber with filler, it causes a disadvantage due to extreme difficulty in obtaining an FRP having a curved face shape due to the carbon fiber being restricted.

As described above, because of so few examples that prepregs, that is, FRP plates applying continuous fiber as a reinforced fiber, being practically used particularly for shell plates, structure and quantitative indication of surface quality have not yet been established for FRP which is considered for practical application.

The coefficient of linear expansion of FRP in the thickness direction thereof is larger than that of metal. If surface smoothness is poor, rain water is retained due to deformation caused by temperature change, and causes a lens effect for light such as ultraviolet, then irregular degradation on painting develops, resulting in a macule pattern on FRP.

It has been found that surface quality of shell plates, in addition to product value or long term durability as described above, renders significant effect on fluid resistance for air and water. Therefore, the necessity for surface quality improvement, for the purpose of energy savings, is required for not only automobiles but also all moving transport machinery such as tram cars, small planes, boats, ships and the like. In general, when a shell plate is made of FRP to save weight, due to the elastic modulus of FRP being smaller than that of metal; the shell plate deforms against air resistance generated during high speed movement of transport machinery and fluid resistance changes considerably. From this point of view, an independent criteria, which is different from that of metal, should be established for the surface of FRP plates.

Returning again, for practical use of an FRP plate applying continuous fiber, establishment of total technologies suitable for FRP plates such as structure, material, and quantitative indication of surface quality, is urgently desired.

Method for producing is described below.

The known art to obtain FRP from molding material, as described above, are a method using autoclave, a method using a vacuum bag, a compression molding method and the like. Of these, the compression molding method is preferable to mass production of FRP having good appearance and high strength due to the molding time thereof being relatively short in comparison to that of a method using autoclave and a method using a vacuum bag. This method also has the advantage of a complex-shaped FRP being easily producible due to easy mold machining.

However, when producing FRP by a compression molding method employing a molding material including continuous reinforced fiber as a reinforcer, a less viscous resin turbulently flows in and on FRP by applied pressure. The turbulent flow disturbs alignment of therein forced fiber, resulting in a so-called bowed filling. The bowed filling on a surface deteriorates the design, and the bowed filling inside causes disturbance of reinforced fiber at the part, resulting in a decrease in mechanical property of FRP. For this reason, production of FRP by the compression molding method has been limited to an FRP using SMC as disclosed in Japanese Unexamined Patent Application, First Publication, No. Hei-10-95048.

DISCLOSURE OF THE INVENTION

The inventors of the present invention, after diligent reach, have reached a conclusion to provide four embodiments which achieve the objects described below.

One of the objects of the present invention is to provide an epoxy resin composition which completes curing in a short time even at low temperature and secures a sufficient usable period under preservation at room temperature, in comparison to conventional epoxy resin compositions; and to provide, by applying a prepreg obtained by using the resin, a fiber-reinforced composite material which exhibits excellent mechanical properties. This object has been achieved by the following first invention.

A first embodiment of the present invention is an epoxy resin composition including component A, component B, component C and component D, wherein each of the contents of a sulfur atom and the component C in said epoxy resin composition is respectively 0.2 to 7% by mass and 1 to 15% by mass.
The component A: an epoxy resin
The component B: an amine compound having at least one sulfur atom in the molecule thereof (component B-1) and/or a reaction product of the epoxy resin and the amine compound having at least one sulfur atom in the molecule thereof (component B-2)
The component C: a urea compound
The component D: dicyandiamide Of the epoxy resin composition described above, preferably used is the epoxy resin composition of which a Gel time at 130° C. is equal to or less than 200 seconds.

The inventors provide, relating to the first embodiment, an epoxy resin composition including component B-2 which is a reaction product of the epoxy resin and an amine compound having at least one sulfur atom in the molecule thereof, a component C and a component D, wherein each of the contents of a sulfur atom and the component C in said epoxy resin composition is respectively 0.2 to 7% by mass and 1 to 15% by mass.
The component B-2: a reaction product of the epoxy resin and an amine compound having at least one sulfur atom in the molecule thereof.
The component C: a urea compound; and
The component D: dicyandiamide The inventors provide, relating to the first embodiment, a method for producing an epoxy resin composition, comprising mixing 100 parts by mass of a component A and 0.2 to 7 parts by mass of component B-1 to obtain a resin composition, followed by further mixing component C and component D to obtain the epoxy resin composition, wherein a content of the component C in the epoxy resin composition is 1 to 15% by mass.
the component A: an epoxy resin;
the component B-1: an amine compound having at least one sulfur atom in the molecule thereof;
the component C: a urea compound; and
the component D: a dicyandiamide Another object of the present invention is to provide a thermosetting resin composition suitable for a prepreg which has a characteristic of high velocity forming ability required in industrial applications in addition to properties exhibited by conventional prepregs, such as handling ability at room temperature, excellence in long life at room temperature and ability to retain favorable properties after being molded. Furthermore, to provide a prepreg impregnated with the thermosetting resin composition; and to provide a method for producing an FRP which is excellent in mechanical strength and thermal properties, and high in velocity by employing the prepreg.

This object has been achieved by the following second embodiment.

The second embodiment of the present invention is that a thermosetting resin composition wherein a viscosity thereof is $5\times10^1$ to $1\times10^4$ Pa·sec at 50° C. and it reaches $1\times10^6$ Pa·sec within 1000 seconds under an atmosphere of 120° C., and the increase in the viscosity at 50° C. after being left for 3 weeks at 30° C. is equal to or less than 2 times.

Further, another object of the present invention is an FRP plate applying continuous fiber, particularly to solve general problems as shell plates in terms of structure, material and surface; to provide not only an FRP plate which is light in weight, high in rigidity and high in strength so as to be suitable for transport machinery, but also an FRP plate having a structure, material and surface for a shell plate made of FRP which has surface quality durable for long use and is environmentally friendly. This object has been achieved by the following third embodiment of the present invention.

The third embodiment of the present invention is that (1) a prepreg which provide a fiber-reinforced composite material (FRP) plate having a medium average roughness (Ra) of a surface thereof equal to or less than 0.5 µm, and the plate is obtained by thermocuring under a molding pressure equal to or more than 10 kg/cm² and a molding time within 15 minutes, and (2) an FRP plate wherein the plate is obtained by thermocuring under a molding pressure equal to or more than 10 kg/cm² and a molding time within 15 minutes, and a medium average roughness (Ra) of a surface of the plate is equal to or less than 0.5 µm.

One of the further objects of the present invention is to produce an FRP by the compression molding method in a short time, which has high strength, excellent design and a substantially continuous reinforced fiber as a reinforcer. This object has been achieved by the embodiment as follows.

The fourth embodiment of the present invention is a method for producing a fiber-reinforced composite material molding comprising:

preliminarily adjusting a temperature of a mold to be equal to or more than the curing temperature of a thermosetting resin;

putting a molding material which has one side surface area $S_1$ and is impregnated with the thermosetting resin in a substantially continuous reinforced fiber, in the temperature-adjusted mold which has one side surface area $S_2$;

fastening the mold following the former process and then filling the whole inside of the mold with a molding material; and being subjected to compression molding in a manner that $S_1/S_2$ is 0.8 to 1.

BEST MODE FOR CARRYING OUT THE INVENTION

Figure 1A:
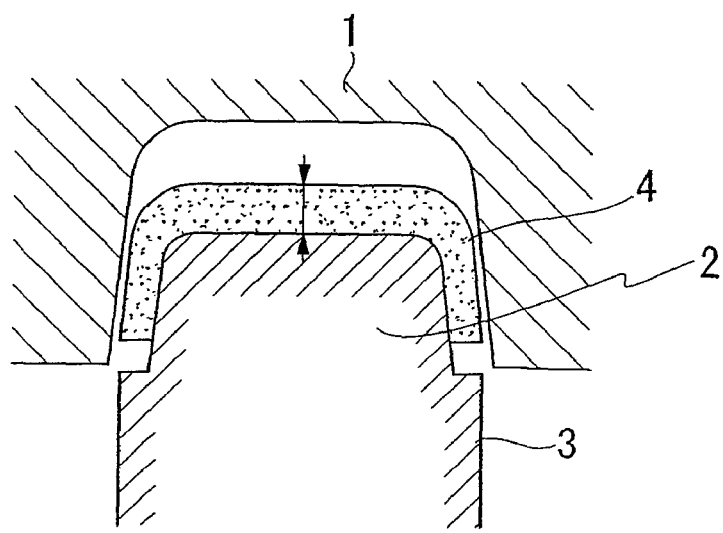
FIG. 1A is a sectional view of a molding material situated in a mold before fastening the mold.

The first to fourth embodiments are described in detail below.

The First Embodiment

The first embodiment is described below, and each component, additives, producing method, prepreg obtained with an epoxy resin and others are described in detail.

By this embodiment, an epoxy resin composition can be provided which can cure even in a short time at low temperature and secure a sufficient usable period under preservation at room temperature, in comparison with conventional epoxy resin compositions. By applying a prepreg obtained by using the resin, a fiber-reinforced composite material can be obtained which exhibits excellent mechanical properties.

(Component A)

The component A in the first embodiment is an epoxy resin. Examples thereof, as bifunctional epoxy resins, include a bisphenol A type epoxy resin, a bisphenol F type epoxy resin, a biphenyl type epoxy resin, a dicyclopentadiene type epoxy resin or modified epoxy resins thereof. Polyfunctional epoxy resins being equal to or more than trifunctional includes, for example, a phenol novolac type epoxy resin, a cresol type epoxy resin; glycidylamine type epoxy resins such as a tetraglycidyldiaminodiphenylmethane, a triglycidylaminophenol, and a tetraglycidyldiamine, glycidylether type epoxy resins such as tetrakis(glycidyloxyphenyl)ethane and a tris(glycidyloxymethane); and modified epoxy resins thereof; brominated epoxy resins which are formulated by brominating aforementioned epoxy resins; but are not limited thereto. Moreover, as the component A, at least one kind of these epoxy resins may be used in combination thereof.

Of these, a bisphenol A type epoxy resin, a bisphenol F type epoxy resin, a bisphenol S type epoxy resin, a phenol novolac type epoxy resin and a cresol novolac type epoxy resin are particularly preferably used. Application of these epoxy resins attains increased mechanical strength of finished moldings in comparison to the case of using more rigid epoxy resins, for example, such as an epoxy resin having a naphthalene structure in the molecule thereof. This is because, as the epoxy resin becomes more rigid, it causes strain due to the increase in cross-linking density when being cured in a short time. The application of epoxy resins described above has little possibility of causing such problems.

On the other hand, there exist epoxy resins having a sulfur atom in the molecule thereof, such as a bisphenol S type epoxy resin and epoxy resins having a thio structure; these may be used for the present invention. To use them effectively in the present invention, however, the content of a sulfur atom in an epoxy resin composition must be determined. As a method to pre-determine the content of a sulfur atom in an epoxy resin, an atomic absorption method and the like may be used.

(Component B)

A component B of the first embodiment is an amine compound having at least one sulfur atom in the molecule thereof (component B-1) and/or a reaction product of the epoxy resin and the amine compound having at least one sulfur atom in the molecule thereof (component B-2);

The component B-1 is not limited as long as an amine compound has at least one sulfur atom in the molecule thereof; preferably used are, for example, a 4,4'-diaminodiphenylsulfone, a 3,3'-diaminodiphenylsulfone, a 4,4'-diaminodiphenylsulfide, a bis(4-(4-aminophenoxy)phenyl)sulfon, a bis(4-(3-aminophenoxy)phenyl)sulfon, a 4'4-diaminodiphenylsulfide, a o-triansulfon, and derivatives thereof.

On the other hand, the component B-2 is a reaction product of the epoxy resin and the amine compound having at least one sulfur atom in the molecule thereof, as mentioned above. Of the epoxy resin composition of the embodiment, a mixture containing the component B-2 can be obtained by mixing and then reacting the component A and component B-1. The component B-2 does not require of component B-1 isolation from the mixture for use.

Moreover, in a process of the embodiment to produce the epoxy resin composition, a part or whole part of the mixture of the component A and the component B-1 may be transformed to the component B-2.

In this case, either or both of the component A and the component B-1 may be completely consumed to transform to the component B-2.

In the embodiment, any of the component B-1 and the component B-2 may be used; application of the component B-2 or a mixture of the component B-1 and the component B-2, improves storage stability.

(Component C)

The component C of the embodiment is a urea compound.

The component C is not particularly limited, but preferably used are urea compounds such as a dichlorodimethylurea and a phenyldimethylurea. Of these, particularly suitably used is a component C having no halogen in the molecule thereof, due to high reactivity and low toxicity thereof.

The urea compound of the present invention further includes diamides of carbonic acid and amides of carbamic acid. These can be obtained by, in general, subjecting amines such as ammonia and the like to a reaction with a phosgene, an ester chloroformate, a carbamoyl chloride, an ester carbonate, an isocyanate, a cyanic acid, and the like.

Moreover, like a ureide (acylurea) which is a urea reacted with an acid chloride, and an alkylurea (ureine) which is urea substituting a hydrogen thereof with a hydrocarbon group; a compound generally called an ureas is included in the urea compound of the embodiment.

The urea compound of the embodiment includes a urea adduct.

The urea adduct represents, as an example for explanation, a urea containing a hydrocarbon in a crystal structure thereof, which is obtained by, for example, mixing an aqueous urea saturated solution with a hydrocarbon or further mixing with a lower alcohol such as a methanol saturated solution.

The content of the component C in the epoxy resin composition requires 1 to 15% by mass. It is preferably equal to or more than 3% by mass and equal to or less than 12% by mass. If it is less than 1% by mass, curing reaction will not often be sufficiently completed; if it is more than 15% by mass, long period preservation at around room temperature may be impossible due to the usable period being shortened.

When a solid substance is used as the component (C), an average particle diameter thereof is preferably equal to or less than 150 μm, more preferably equal to or less than 50 μm. If the average particle diameter is more than 150 μm, the dispersion rate is reduced; the reduction makes a curing reaction rate decrease, resulting in that curing in a short time, being the most important effect of the present invention, may be impossible to achieve.

(Component D)

The component D in the first embodiment is a dicyandiamide. The dicyandiamide works as a curing agent for the epoxy resin, and enables to achieve curing at a relatively low temperature by combined use of other components of the embodiment.

In the embodiment, a content of the component D in the epoxy resin composition is preferably 0.1 to 10% by mass. An average particle diameter of the component D is preferably equal to or less than 150 μm, particularly equal to or less than 50 μm in order to have favorable dispersibility, resulting in an increased reaction rate.

(Other Additives)

The epoxy resin composition of the first embodiment may be added with an appropriate amount of inorganic fine particles such as a fine powder silica; pigments; elastomers; flame retardants such as aluminium hydroxide, bromides and phosphorus compounds; defoaming agents; thermoplastic resins soluble to epoxy resin such as a polyvinylacetal resin and a phenoxy resin for the purpose of improving the handling ability and flexibility; imidazole derivatives, metal complex salts, tertiary amine compounds which act as a catalyst for curing reaction, or the like.

(Content Rate of Sulfur Atom in Epoxy Resin Composition)

The epoxy resin composition of the first embodiment should be such that a content of the sulfur atom in the epoxy resin composition is 0.2 to 7% by mass. If it is less than 0.2% by mass, completion of curing in a short time at low temperature becomes difficult; if it is more than 7% by mass, the usable period may be decreased.

(Gel Time)

The epoxy resin composition of the first embodiment is preferably that a Gel time thereof at 130° C. is equal to or less than 200 seconds. The Gel time of the embodiment is a time until gelation is finished when an uncured epoxy resin composition is subjected to a pre-determined temperature. Herein, the gelation means a state that the epoxy resin composition forms a three dimensional network structure in molecules thereof, resulting in lost fluidity thereof.

The epoxy resin composition having the Gel time at 130° C. equal to or less than 200 seconds, can realize curing in an especially short time.

(Method for Producing the Epoxy Resin Composition)

A method for producing the epoxy resin composition of the embodiment may be, for example, adding appropriate amounts of the component A, the B-1 component, the component C, the component D and other additives mentioned above, and mixing them. In this method, as aforementioned, there is no problem that a part or whole part of the component A and the component B-1 react to transform the component B-2.

Alternatively, the component A and the component B-1 may be pre-mixed to prepare the component B-2, followed by further mixing with the component C and the component D.

The temperature at mixing is preferably 50 to 180° C., more preferably 60 to 160° C.

(Prepreg)

By impregnating the epoxy resin composition mentioned above as a matrix resin in a reinforced fiber, a prepreg can be obtained which is able to be molded in a short time at relatively low temperature. The production of the prepreg can be carried out by known devices and methods.

The reinforced fiber applicable to the prepreg of the first embodiment is not particularly limited, can employ various kinds depending on the purpose of the complex materials to be used. For example, preferably used are carbon fibers, graphite fibers, aramid fibers, silicone carbide fibers, alumina fibers, boron fibers, tungsten carbide fibers, glass fiber and the like. Moreover, these fibers may be used in plural combination thereof.

Of these reinforced fibers, carbon fibers and graphite fibers are preferable for the present invention due to favorable specific elastic modulus and the large effect on weight saving. Although any kind of carbon fiber or graphite fiber can be applied depending on applications, particularly preferable is one having a tensile strength equal to or more than 3500 Ma and tensile elasticity equal to or more than 190 GPa.

A configuration of the reinforced fiber in the prepreg is not limited, may be unidirectional or woven reinforced fiber, or an unwoven fabric employing a reinforced fiber cut in staple. Particularly, when the unidirectional or woven configuration is applied, although conventional compression moldings are impossible to obtain fiber-reinforced composite materials having good appearance because of resin flow in a mold due to the length of time until curing completion, application of the epoxy resin composition of the embodiment can obtain fiber-reinforced composite materials having good appearance because of the epoxy resin composition curing in a short time.

The Second Embodiment

The second embodiment is described below, and specific explanations regarding each sentence, preferable examples and the like are described in detail.

The second embodiment provides a thermosetting resin composition suitable and excellent for a prepreg which is excellent in handling ability at room temperature and has a long life at room temperature, and is able in high speed molding to retain favorable properties thereof after being molded; the high speed molding which is required for industrial application.

"Measurement of Viscosity"

The inventors have diligently researched to solve the problems described above, and confirmed the importance of a viscosity of the thermosetting resin composition, a time to reach target viscosity under heating (specifically 120° C.) and a viscosity after being left. In the second embodiment, a viscosity measurement is carried out by RDS-200 manufactured by RHEOMETRICS (equivalent viscosity meters are also applicable), and the value obtained is a value measured using the parallel plate of 25 mmφ under a frequency of 1 Hz. The heating conditions (specifically 120° C.) will be described in detail in sections concerning such matters.

"The Viscosity at 50° C. Shall be $5 \times 10^1$ to $1 \times 10^4$ Pa·Sec."

the thermosetting resin composition of the second embodiment shall have a viscosity at 50° C. of $5 \times 10^1$ to $1 \times 10^4$ Pa·sec.

If the viscosity is less than $5 \times 10^1$ Pa·sec, tackiness at room temperature of the prepreg becomes too strong, resulting in deterioration of handling ability; contrary to this, if the viscosity is more than $1 \times 10^4$ Pa·sec, draping ability of the prepreg is lost, also resulting in deterioration of handling ability.

"To Reach $1 \times 10^6$ Pa·Sec within 1000 Seconds Under an Atmosphere of 120° C."

The thermosetting resin composition of the second embodiment should reach $1 \times 10^6$ Pa sec within 1000 seconds under an atmosphere of 120° C.

If the time of the viscosity reaching $1 \times 10^6$ Pa·sec is more than 1000 seconds, the molding time at high temperature increases. In the case it is within 800 seconds, it is preferable because the molding time at high temperature decreases, while in the case it is within 600 seconds is further preferable.

The measurement method applies the method described in the aforementioned "Measurement of viscosity" and a heating up condition to reach the temperature of the heated state (specifically 120° C.) is carried out as follows. Setting a sample of the thermosetting resin composition at 50° C., followed by raising the temperature to 120° C. at a rate of 10° C./minute, and then the isothermal viscosity is measured at 120° C. Time is counted starting from the point of the temperature having reached 120° C., until the viscosity having reached $1 \times 10^6$ Pa·sec. If it is difficult to measure the time until the viscosity reaches $1 \times 10^6$ Pa·sec, the time until the viscosity having reached at least $1 \times 10^2$ Pa·sec is measured, and then a time for assuming to have reached $1 \times 10^6$ Pa·sec is estimated by extrapolating the last two values. For this estimation, viscosity measurement must be those which can have at least equal to or more than one digit. That is, when a viscosity of $1 \times 10^6$ Pa·sec is estimated by extrapolating the data at $1 \times 10^2$ Pa·sec, the viscosity having reached 120° C. must be equal to or less than $1 \times 10^1$ Pa·sec.

"Increase in the Viscosity at 50° C. after being Left for 3 Weeks at 30° C. is Equal to or Less than 2 Times."

The thermosetting resin composition of the second embodiment should be that an increase in viscosity at 50° C. after being left for 3 weeks at 30° C. is equal to or less than 2 times.

Viscosity measurement method is carried out by the same manner of "Measurement of viscosity." When the increase in the viscosity is more than 2 times, stability of the prepreg at around room temperature is deteriorated.

"Resin Composition"

Raw materials of the thermosetting resin composition of the second embodiment are not particularly limited, exemplified by epoxy resins, phenol resins, vinylester resins, unsaturated polyester resins, bismaleimide resins, BT resins, cyanate ester resins, benzoxadin resins, acrylic acid resins, and the like; preferably used are, in terms of handling ability and properties of the cured product, epoxy resins, bismaleimide resins, BT resins, cyanate ester resins; of these, epoxy resins are particularly preferably used due to excellent adhesive ability thereof with reinforcers.

The thermosetting resin composition of the embodiment may be added with thermoplastic resins and other additives in order to improve handling ability of the prepreg, and improve appearance and properties such as impact resistance and the like of FRP after being molded.

Thermoplastic resins suitably added to the second embodiment are, for example, polyaramides, polyesters, polyacetals, polycarbonates, polyphenylene oxides, polyphenylene sulfide, polyarylates, polyimides, polyetherimides, polysulfones, polyamides, polyamide-imides, and polyetheretherketones.

Other additives are exemplified by, as elastomers, synthetic rubbers such as butyl rubbers, isoprene rubbers, nitrile rubbers and silicone rubbers; and natural rubbers such as latex.

"Addition of Filler"

It is preferable that the thermosetting resin composition of the second embodiment be added with filling agents such as a filler to have favorable surface smoothness of the FRP obtained. As fillers, calcium carbonate is preferable, and particle diameter of the calcium carbonate is preferably 3 to 10 μm.

The amount of filler added varies depending on the kind of resins of the thermosetting resin composition, being preferably 10 to 300 parts by mass relative to 100 parts by mass of the thermosetting resin composition.

When the additives described above are added to the thermosetting resin composition of the embodiment, the product, as a matter of course, must be finally a thermosetting resin composition which is able to be impregnated in the prepreg and satisfies the viscosity conditions described above.

"Prepreg"

The prepreg of the second embodiment is a prepreg impregnating the thermosetting resin composition of the present invention in a reinforcer. Materials of the reinforcer used for the prepreg of the embodiment are not particularly limited, exemplified by carbon fibers, glass fibers, aramid fibers, high strength polyethylene fibers, boron fibers and steel fibers; preferably used are carbon fibers and glass fibers due to the performance of the FRP obtained, particularly in terms of lightness in weight and mechanical properties such as high strength and high rigidity.

Forms of the reinforcer used for the prepreg of the embodiment are also not particularly limited, exemplified by plain weave, twill weave, satin weave, stitching sheets such as a non-crimp fabric for which fiber bundles are layered in one direction or in a variable angle to avoid raveling, unwoven fabric or matted cloth, or moreover a unidirectional material for which the bundle of reinforced fiber is in one direction; preferably used are fabrics excellent in handling ability or stitching sheets.

The amount of resin contained in the prepreg of the embodiment is not particularly limited; however, it is preferable that the lower the resin amount contained, the better the appearance of the FRP obtained and the greater the reinforcement effect of the reinforcer becomes. Specifically, a volume content of the thermosetting resin composition in the prepreg is preferably equal to or less than 45% by volume, more preferably equal to or less than 40% by volume, still more preferably equal to or less than 35% by volume.

Regarding the lower limit of the volume content of the thermosetting resin composition in the prepreg; this is not preferable because if the amount contained of the thermosetting resin composition is too low, the thermosetting resin composition is often not filled in every corner of the FRP. Specifically, the amount of the thermosetting resin composition contained is preferably equal to or more than 20% by volume, more preferably equal to or more than 25% by volume.

"A Method for Producing FRP"

The method for producing FRP of the second embodiment is a method for producing FRP which includes setting the prepreg of the embodiment in a mold, followed by fastening the mold and heating and pressurizing to mold. The mold is not particularly limited; preferably it is a metal mold that is hard to deform when being subjected to high pressure.

The temperature for heating is also not particularly limited; it is preferable that the higher the temperature is, the shorter the molding time is made possible. Specifically, equal to or more than 120° C. is preferable, equal to or more than 140° C. is more preferable. However, if the temperature is too high, it takes too much time to lower the temperature of the mold, or, in the case of setting the prepreg without lowering the temperature, the resin often does not flow in every corner of a finished product due to commencement of curing. Therefore, heating is preferably equal to or less than 200° C., more preferably equal to or less than 180° C. The extent of pressurizing is also not particularly limited; molding by high pressure is preferable in order to decrease pin holes on the surface and voids in the FRP. Specifically, the pressure subjected to the prepreg is preferably equal to or more than 0.5 Mpa, more preferably equal to or more than 1 Mpa. The upper limit is sufficient at 100 Mpa.

The device and method of molding are also not particularly limited; applying a hydraulic hot press is most effective and suitable for the method for producing the FRP of the present invention. A mold of such a case is preferably an airtight system mold having a share edge structure.

The Third Embodiment

The third embodiment is described below.

The third embodiment provides an FRP plate applying a continuous fiber, especially a superior prepreg and FRP plate which solves comprehensive problems of shell plates such as structure, material and appearance.

<Prepreg>

"Molding Pressure"

The prepreg of the third embodiment should be a prepreg that is molded by the molding pressure equal to or more than 10 kg/cm$^2$ by impregnating a matrix resin in a substantially continuous reinforced fiber, for the purpose that an FRP plate has good surface quality of which the center line average roughness (Ra) is equal to or less than 0.5 μm, allowing a surface quality of long use.

If the molding pressure is less than 10 kg/cm$^2$, it is difficult to obtain good surface quality.

"Molding Time"

In the third embodiment, it is necessary to thermally cure within 15 minutes of the molding time, in order to obtain an FRP plate for applications of transport machinery which is under particularly high cost-consciousness; more preferably being within 10 minutes. The molding time of the present invention means a time while the prepreg is subjected to molding temperature and pressure.

"Reinforced Fiber"

The reinforced fiber applicable in the third embodiment is not particularly limited as long as it is a substantially continuous reinforced fiber; carbon fibers, glass fibers, aramid fibers, polyester fibers, boron fibers and the like can be used. Of these, for members of aircraft and automobiles, carbon fibers having high specific strength and elasticity are most preferably used.

Forms of the reinforced fiber in the molding material can use a reinforced fiber which is unidirectional, a woven reinforced fiber and the like, not particularly limited thereto. For example, to enhance the design of an FRP, a plural reinforcement form can be used at the same time such that a molding material of the surface of the FRP is reinforced by a fabric of the reinforced fiber along with the inside thereof using a unidirectional reinforced fiber.

In the present specification, substantially continuous reinforced fiber means a fiber substantially having no end thereof in a molding material.

The prepreg of the embodiment preferably applies carbon fibers as a reinforced fiber. The carbon fiber can use any of PAN (polyacrylonitrile) based carbon fiber and pitch based carbon fiber. The carbon fiber of the PAN based is more preferable to weave fabric in terms of balance between strength, elastic modulus and elongation. Although it is preferable for strength and elastic modulus to be high as possible for shell plates, a carbon fiber having elongation equal to or more than 1.4% is preferable to retain impact resistance. Elongation of FRP is measured according to JIS K-7054. It strictly means tensile fracture distortion.

"Woven Carbon Fiber"

A woven carbon fiber is a fabric form woven in a continuous fiber state by plain weave, twill weave, satin weave or the like. Of these, the fabric of the present invention is preferably in a range of 700 to 1700 in terms of a ratio (w/T) of weight per unit area (W g/cm$^2$) of woven carbon fiber to thickness (t mm) thereof.

The fabric included in the range is called a gauzy fabric, and has a thin and spreading fiber form relative to the value of weight per unit area thereof. This form develops high strength and rigidity due to small weaving in the thickness direction of the fabric, allowing weight-saving shell plates. Moreover, small unevenness in the fabric surface improves surface quality of the shell plates and durability of the FRP plates. The weight per unit area and the thickness of the fabric are measured according to JIS R7602.

It is preferable that a cover factor of the woven carbon fiber is in a range of 90 to 100%, in order that parts consisting only of resin become quite small, impact characteristics on the outer surface increases, and highly clear mapping ability is obtained as a result of little surface unevenness or uneven irregularity caused by shrinkage in the resin thickness direction. If assuming a small flying piece, from the consideration of the of perforating impact, a more preferable cover factor is in a range of 95 to 100%.

The cover factor Cf of the woven carbon fiber is, as disclosed and defined in Japanese Unexamined Patent Application, First Publication, No. Hei-7-118988, a factor relating gaps formed between woven fibers; when setting a region of area S on a fabric, by allowing s to be an area of gaps formed between woven fibers in the area S, the cover factor being a value defined by the following formula.

$$\text{Cover factor } Cf\ (\%) = \{(S-s)/S\} \times 100$$

Since the fabric contributes face rigidity and surface quality which is particularly important among properties of shell plates, the fabric is preferably disposed in the vicinity of the surface layer of a plate. By a high rigid carbon fiber being present at the surface layer of the shell plate, the face rigidity of the shell plate becomes greater to allow weight savings.

The most preferable location is the outermost layer. Moreover, when a multiaxial fabric such as a bi- or tri-axial is at the most outer layer, design of a unique fabric can also be provided to the shell plate. Furthermore, by disposing a fabric of which the relation between the weight per unit area and the thickness are situated in the range described above, at the most outer layer, the surface of the shell plate becomes quite smooth, and also is smooth when being coated with thin paint film.

In other words, since the gauzy fabric in which the ratio (W/t) of the weight per unit area (W g/m$^2$) to the thickness (t mm) of the woven carbon fiber is in the range of 700 to 1700, is small in meandering and unevenness in the thickness direction of fibers, when being used for a shell plate, it can obtain a surface, which is small in thickness change of resin layer at a surface, and smoothness before and after painting.

When the cover factor is in the range of 90 to 100%, a part consisting only of resin in the thickness direction of the shell plate, is eliminated, so that the clear mapping ability which is a very important property in terms of durability, is improved, resulting in practical usability; this is preferable.

"Reinforced Fibers Other than Carbon Fiber"

In the present invention, inorganic fibers such as a glass fiber, an alumina fiber and a silicon nitride fiber, and organic fibers such as an aramid fiber and nylon, may be used together with the carbon fiber. By disposing filament, staple, fabric or mat of these fibers, or a mixture thereof, regularly or irregularly in the carbon fiber or the resin, impact resistance, vibration damping property and the like are improved.

Of these, a glass fiber is inexpensive and favorable in strength balance of compression/tensile. The glass fiber is a fiber glass as a so-called E glass, C glass, S glass or the like which includes silicon dioxide ($SiO_2$) as a major component; preferable is one having a fiber diameter of about 5 to 20 µm. Since the glass cloth improves rigidity and retains resin, it improves molding ability. Suitable is a 20 to 400 g/m$^2$ of cloth weight per unit area. When being used in a surface layer, preferable is 20 to 50 g/m$^2$ to maintain a transparent feeling without damaging the design of the fabric.

The amount of glass fiber used is equal to or less than 50% by weight based on the carbon fiber when rigidity is required, or equal to or less than 80% by weight based on the carbon fiber when impact resistance is required.

Organic fibers are not brittle like carbon fibers and glass fibers but ductile, and have the characteristics of flexibility and bending fracture resistance. Moreover, since synthetic fibers, in comparison to carbon fibers, have the feature of no possible electrical corrosion, they have the advantage of no requiring electrical corrosion protection.

Furthermore, when being compared with glass fibers, they have advantages such as easy disposability due to combustibility thereof, and weight savings of members due to specific weight thereof being about half of that of glass fibers.

"Matrix Resin"

The resin constituting FRP plates of the third embodiment includes thermosetting resins such as epoxy resins, vinylester resins, unsaturated polyester resins, phenol resins, benzoxadin resins, acrylic acid resins, and the like, and modified resins thereof.

Of these, preferable are epoxy resins, polyester resins, vinylester resins, and modified resins thereof which are excellent in chemical resistance, weather resistance, and the like. Phenol resins and benzoxadin resins are preferable for shell plates which require excellent flame retardancy and thermal resistance.

Moreover, transparent resins such as acrylic resins and the like are preferable in terms of design. Of these, acrylic resins are preferable due to weather resistance thereof. Such resins can be improved in weather resistance thereof by addition of ultraviolet absorbers, sunlight absorbers and antioxidants of 3 to 20%.

"Resin Composition (1)"

A preferable matrix resin applied in the third embodiment includes the epoxy resin composition of the first embodiment of the present invention (refer to the description of the first embodiment, and hereinafter may be referred to as resin composition (1)). The materials, conditions, preferable examples and the like described in the resin compositions of the first embodiment, are also preferable in the third embodiment as long as no particular problems arise.

When the resin composition (1) is applied, curing can be achieved in a short time at a relatively low temperature, a prepreg obtained by using the epoxy resin composition has a sufficient usable period when being held at room temperature, and an FRP plate obtained from the prepreg develops excellent mechanical properties. Furthermore, by using the prepreg, a fiber-reinforced composite material can reduce processing time in molding, allowing production cost savings.

(Other Additives)

The resin composition (1) can use the same additives mentioned in the first embodiment.

(Content of Sulfur Atom in Resin Composition (1))

The resin composition (1) can have the same content of the sulfur atom described in the first embodiment.

(Gel Time)

The resin composition (1) preferably has the same Gel time of the first embodiment.

(Method for Producing Resin Composition (1))

The resin composition (1) can be produced by the same method as in the first embodiment. The conditions preferable in the first embodiment are also preferable in the third embodiment.

(Prepreg)

In the third embodiment, as performed in the first embodiment, a prepreg can be obtained by impregnating the resin composition (1) as a matrix resin in a reinforced fiber. Kinds and forms of the reinforced fiber can be the same as that of the first embodiment, and that preferable in the first embodiment is also preferable in the third embodiment.

A form of reinforced fiber in the prepreg is not particularly limited; included are unidirectional or woven reinforced fibers, nonwoven fabrics employing short-cut reinforced fiber, or the like. Particularly, when unidirectional or woven reinforced fibers are applied, fiber-reinforced composite materials have a favorable appearance, are conventionally impossible by compression molding methods, because resins flow in mold when the curing time become long; however, by using the epoxy resin composition of the embodiment, fiber-reinforced composite materials having a favorable appearance can be obtained, because the epoxy resin composition cures in a short time.

As described in detail, the resin composition (1) is able to cure in a short time at a relatively low temperature. Consequently, a prepreg obtained by applying the epoxy resin composition has a sufficient usable period under preservation at room temperature, a composite obtained by the prepreg has the effect expressing excellent mechanical properties. Furthermore, by using the prepreg, a fiber-reinforced composite material can reduce processing time in molding, allowing production cost savings.

"Resin Composition (2)"

Moreover, a matrix resin preferably used for the prepreg of the third embodiment, from the consideration of curing properties thereof, preferably uses the thermosetting resin composition of the second embodiment of the present invention (refer to the second embodiment, hereinafter may be referred to as resin composition (2)). The materials, conditions, preferable examples and the like described in the resin compositions of the second embodiment, are also preferable in the third embodiment as long as no particular problems arise.

The thermosetting resin composition is suitable for a matrix resin for a prepreg which retains handling ability at room temperature, long life at room temperature and favorable properties after molding, and can allow high speed molding required for industrial applications. Also, the prepreg retains handling ability at room temperature, long life at room temperature and favorable properties after molding, and can allow high speed molding required for industrial applications; resulting in making high speed molding required for industrial applications possible.

The resin composition (2) is described in detail below.
(Measurement of Viscosity)
The measurement is carried out in the same manner performed in the second embodiment.
(The Viscosity at 50° C. is $5\times10^1$ to $1\times10^4$ Pa·Sec)
Same as the description in the second embodiment.
(To Reach $1\times10^6$ Pa·Sec Equal to or Less than 1000 Seconds Under an Atmosphere of 120° C.)
Same as the description in the second embodiment.
(Increase in Viscosity at 50° C. after being Left for 3 Weeks at 30° C. is Equal to or Less than 2 Times)
Same as the description in the second embodiment.
(Resin Composition)
Same resin composition described as in the second embodiment can be used.
(Addition of Filler)
Can use the same described as in the second embodiment.
(Prepreg)
Can be produced in the same manner according to the description of the second embodiment. The preferable amount, material and the like in the second embodiment are also preferable as in the third embodiment.
(A Method for Producing FRP)
By the same manner performed in the second embodiment, FRP can be produced in the third embodiment. The preferable production conditions, methods, examples of device and the like in the second embodiment are also preferable as in the third embodiment.

The resin composition (2) can provide a thermosetting resin composition suitable for a matrix resin for a prepreg which retains handling ability at room temperature, long life at room temperature and favorable properties after molding, and can allow high speed molding required for industrial applications.

Also the prepreg employing the resin composition (2) can retain handling ability at room temperature, long life at room temperature and favorable properties after molding, in addition to high-speed molding required for industrial applications. The resin composition (2) is very suitable for high speed molding, and significantly contributes to cost savings of molding processing which has been the greatest drawback of FRP.

"Ratio of Matrix Resin in the Prepreg"

A ratio of matrix resin in the prepreg is preferably within a range of 20 to 45% by mass ratio. If it is more than 45%, weight-savings may be sacrificed to achieve rigidity and impact resistance of FRP at a level of metal shell plates.

The reason why it is equal to or more than 20% is, if it is less than 20%, impregnation of the matrix resin becomes difficult, resulting in unfavorable properties due to development of voids.

It is preferable that, when the ratio of the matrix resin in the prepreg is 20 to 30% and an epoxy resin is applied as the matrix resin, sufficient flame retardant ability be obtained without addition of a flame retardant to the epoxy resin.

"Surface Roughness Degree—Medium Average Roughness (Ra)"

It is necessary for the prepreg of the embodiment that a medium average roughness (Ra) of a surface of the FRP obtained by the molding conditions described above, be equal to or less than 0.5 μm from the point of view of a decrease in appearance and durability due to unevenness of the surface of the FRP plate. When the medium average roughness (Ra) is equal to or less than 0.5 μm, it is more preferable. The unevenness cannot be removed by painting, or rather becomes noticeable. Furthermore, not only is the appearance damaged, but stress will be concentrated at the top of the concavity depending on the degree of unevenness to accelerate fracture; therefore, the smaller the unevenness is, the greater the durability of the shell plate improves.

The medium average roughness (Ra) of the FRP surface of the embodiment is measured by the Surface Roughness Measuring System 178-368 (analysis unit 178) manufactured by MITUTOYO under the conditions; cutoff value: 2.5 mm, measured zone: 2.5×5 mm, range: 5 μm. Since the FRP surface could develop unevenness derived from scars of mold surfaces, such parts are of course eliminated from measurement objects in the measurement.

"Molding Method"

The prepreg of the embodiment can provide FRP plates by curing as follows.

A mold having a structure such that gas can escape from the mold but resin is restricted from flowing out when the mold is fastened, and the surface precision thereof is equal to or more than #800, is pre-heated to equal or more than the curing temperature of a thermosetting resin, followed by putting in the mold a layered composite of prepreg described above which comprises continuous carbon fiber; and then the mold is fastened, followed by filling the whole inside of the mold with the layered composite of the prepreg to be subjected to compression molding.

The structure of the mold, that is, "the structure to allow gas to escape from the mold but restrict resin from flowing out when the mold is fastened" includes a generally so-called share edge structure or a rubber sealed structure.

Furthermore, it is preferable that the mold has a structure capable the degassing inside thereof when the mold has been fastened or is being fastened.

The degassing mechanism includes a method for situating openable and closable holes in a mold to open to the outside of the mold, or a method for communicating the aforementioned holes and a vessel degassed by pumping via a valve to at once degas the mold inside by opening the valve when the mold is being fastened.

Furthermore, to easily perform stripping off of FRP plates after finishing the FRP plate molding, it is possible to equip the mold with a mechanism for stripping off the FRP plate such as an ejector pin or air blow valve. With the mechanism, FRP plates can be easily stripped off without waiting for the mold to cool down; this is suitable for mass production. The stripping mechanism may be any of the known arts besides the ejector pin, air blow valve or the like.

It is preferable, in order to prevent the matrix resin from extreme flow due to being subjected to pressure, that the aforementioned layered product of prepreg is including continuous carbon fiber (one side surface area is $S_1$), put in the mold (one side surface area is $S_2$), in a manner of $S_1/S_2$ of 0.8 to 1. Flow of matrix causes flow of reinforced fiber, and results in unevenness on the FRP plate surface. The unevenness cannot be eliminated by painting, or it rather becomes noticeable. Furthermore, not only is the appearance damaged, but also stress will be concentrated at the top of the concavity depending on the degree of unevenness to accelerate fracture; therefore, the smaller the unevenness is, the greater the durability of the shell plate improves.

The FRP plate is stripped off after being cured, followed by being further subjected to uniform painting by a spray gun or the like to obtain a product. Since molding shrinkage or thermal shrinkage of the resin in molding affects the surface quality, epoxy resins of which molding shrinkage are small or low shrinkage resins containing fillers such as talc, glass fine particle, calcium carbonate or the like, are preferable.

The molding temperature is preferably equal to or more than 10° C. of the temperature at which shell plates are used. In the case of a shell plate for automobiles, it is preferably equal to or more than 90° C., more preferably equal to or more than 110° C., but in order to shorten the molding time, still more preferably equal to or more than 130° C.

"FRP Plate"

The thickness of the FRP plate varies depending on application; in the case of ground transport machinery such as automobiles and the like, it is preferably in a range of 0.5 to 8 mm. If it is less than that range, problems may occur in perforation resistance, if it exceeds the range, and weight savings is not sufficient.

In the case of aviation transport machinery, it is preferable it is in a range of 1 to 10 mm because speed of the machinery is further high.

Moreover, structures such as sandwich structures, corrugated structures, or structures in which a partial frame is provided to a shell plate, are also preferable responses.

With the FRP plate of the third embodiment, by applying a continuous carbon fiber as reinforced fibers, high elastic modulus and strength can be developed which is one of the characteristics of carbon fibers, and achieves resistance against dents, rigid feeling and strength necessary for shell plates while saving weight thereof. And, on account of continuous fiber, perforating impact resistance which is a very important characteristic for shell plates, can be obtained. That is, with a light weight never being achieved by a mono staple fiber, rigidity and impact characteristics can be obtained. As a matter of course, deformation resistance, maximum load, displacement amount and energy absorption are large.

Furthermore, since the continuous fiber has fabric form, perforating impact resistance characteristics becomes much higher relative to layered prepreg in which arrangement is in one direction even if the same amount of reinforced fibers are used. In principle, since the fabric has a form interweaving fibers like a net, flying objects can be captured.

Moreover, since the fabric has equal physical properties in two directions orthogonally crossing each other in one (mono) layer thereof, it can compose shell plates with a fewer number of layers to achieve weight savings, in comparison with the case that prepreg in which arrangement is in one direction is layered. For example, when the shell plate is composed by layering orthogonally crossing two prepregs, an out-of-plane twisted deformation called saddle type develops due to thermal shrinkage incuring. The out-of-plane deformation is not an external force type but also caused by a temperature change. When in-plane stress acts on shell plates, stress also develops and results in distortion on the shell plates; the distortion is not preferable in terms of appearance and aerodynamics.

Still moreover, by applying as reinforced fibers a carbon fiber which is light and high in elastic modulus and strength, the shell plates become light, high in mechanical properties, and excellent in environmental resistance.

"Painting"

The FRP plate of the present invention may be subjected to painting on a surface thereof. The painting is thinner (usually equal to or less than 150 micrometers) and lighter than gel coating. The painting allows for wide choice not only in colors but in characteristics. Selection of suitable paints can provide characteristics and functions which cannot be covered only with the FRP plate, and gives practical ability as a shell plate. Examples of the characteristics and functions include gloss and unevenness of surface, availability in low or high temperature environment, water resistance, ultraviolet environment resistance and the like.

For example, when resin applied to a resin part of an FRP plate is weak in ultraviolet resistance, by being subjected to painting excellent in ultraviolet resistance, the ultraviolet resistance can be provided to shell plates. As a matter of course, various appearances (cosmetic) are possible, which is preferable in terms of design. Shell plates are required for matching colors thereof with other members in consideration of safety and the like, while the painting allows for delicate color matching. The painting prevents the FRP from direct incidence of water or light, and high resistance shell plates excellent in environmental resistance become available. The painting is also preferable in terms of fluid resistance.

Preferable thickness of painting is equal to or less than 20 to 200 µm. If it is more than 200 µm, paint coating becomes easily exfoliated, which is not preferable in terms of mechanical properties and appearance. If it is less than 20 µm, degrading is caused due to direct incidence of light such as sunlight, or painting irregularity is often caused, that being not preferable in terms of design. By controlling thickness within the range, FRP shell plates will be without a weight increase and preferable in durability. More preferably it is 40 to 100 µm.

Paint can be selected, for example, from paints including synthetic paints such as a silicon/epoxy based paint, an acrylic resin paint, a urethane resin paint, a polyester resin paint, an epoxy resin paint, a fluorine resin paint, a cashew resin paint, an alkyd resin paint, an aminoalkyd resin paints, a phenol resin paint, an oil paint, an oil varnish, a nitrocellulose lacquer; a water soluble resin paint, a primer surfacer, a primer surfacer putty.

Paint is classified into natural seasoning or ambient temperature seasoning paints of monoliquid type, biliquid type and multiliquid type; a baking paint, an ultraviolet curing paint, an electron beam curing paint, and the like. Also being classified according to painting method, a paint for spraying, a paint for rolling, a paint for flow coater, a paint for brushing, and the like.

To select paints, a paint having favorable adhesiveness with resins of FRP is preferably selected. Since FRP is inferior to metals in ultraviolet resistance, a paint having weather resistance is preferably selected. Specifically, paints called sunlight blocking paints or ultraviolet blocking paints, include a compound paint in which carbon black as a pigment and UV absorber or reduced telopolyacid and the like are added to an alkyd acrylic urethane vehicle, an acrylic urethane epoxy silicone paint added with black pigment such as cobalt oxide, copper oxide, iron black and the like; and a fluorine based paint. When clear painting is applied, additives described above are especially indispensable.

Conductive coatings are also preferable which are dispersed with conductive fillers such as a carbon black, a graphite, metal powders and the like. Since paints added with conductive materials such as tin oxide or antimony oxide provide transparent conductive coating, they are preferable for utilizing design of woven carbon fibers, or providing antistatic effects to prevent shell plates such as automobiles from dust and stains due to static charge.

For shell plates of transport machinery which must stimulate awareness at night or the like, it is effective to subject luminescent paints (luminous paints) listed in JIS K5671 as a whole or in part of the shell plate.

The painting methods can apply a spray (spraying) coating (airgun method, airless method or the like), an electrostatic coating (electrostatic spraying method, gun method, or the like), an electrodeposition coating (cation type, anion type, or the like), a powder coating (spraying method, fluidizing coating method, electrostatic powder coating method or the like), or known special coating methods.

Of these, a preferable method for the FRP plate of the embodiment is an electrostatic coating due to excellent coating ability; the coating, because of heat resistance being lower than metals, is carried out using the FRP as an anode in drying temperature equal to or less than 120° C. Moreover, since carbon fibers are electroconductive, electrostatic coating is also a preferable coating method in terms of high paint efficiency.

As regards the application of the painting thickness, surfaces of the FRP plate are preferably subjected to degreasing or sanding to strip off mold releasing agents. By applying non-silicon based mold releasing agents, degreasing or sanding processes can be eliminated or reduced. Since the painting temperature relates considerably to temperature resistance of shell plates, painting and drying are preferably carried out around allowable temperature limits. In the case of shell plates for automobiles, the allowable temperature limit is around 100° C., therefore drying temperature of paint is preferably in a range of 60 to 110° C.; drying time being around 3 to 60 minutes.

Painting color is determined by color coordination with other members; for the FRP shell plate of the embodiment which employs woven carbon fiber as a reinforcer base material, clear painting is preferable in order to visibly observe a degraded state or internally damaged state of FRP parts. The clearness makes possible to finely recognize the state of the FRP, and stir motivation in the use of FRP shell plates to those who only know of metal shell plates. The clear painting, as a matter of course, has effects to enhance product value by utilizing design of fabric. The clear painting may be whole or a part of a shell plate.

Typical clear paints include silicon/epoxy based paints, acrylic based paints; but a urethane based, mixture of the paints, alloy based, or colored clear may be possible.

A suitable woven carbon fiber is a fabric having a large ratio of weight per unit area to thickness. Painting is carried out by a painting method such as the spray gun which can form a uniform thin coating film. If the coating film is too thin or thick, clear mapping ability may be decreased, therefore suitable thickness is preferable.

"Applications of FRP Plate"

The FRP plate of the embodiment can be applied to inner and outer plates of transport machinery such as two-wheeled vehicles, automobiles, high speed vehicles, high speed boats, motorcycles, bicycles, aircraft and the like.

Specifically included are, panels for two-wheeled vehicles such as motorcycles frames, cowls, fenders and the like; automobile panels such as doors, bonnets, tail gates, side fenders, side panels, fenders, trunk lids, hardtops, side mirror covers, spoilers, diffusers, ski carriers and the like; automobile members such as engine cylinder covers, engine hoods, chassis and the like; shell plates for vehicles such as noses of the front of the vehicle, roofs, side panels, doors, dolly covers, side skirts and the like; interiors for vehicles such as overhead baggage racks and seats; inner panels, outer panels, roofs, floors, and the like of wings of wing trucks; aeromembers such as air spoilers and side skirts equipped on automobiles or motorcycles; aircraft applications such as windowsills, overhead baggage racks, seats, floor panels, wings, propellers, bodies and the like; housings of laptop personal computers and cell-phones; medical applications such as X ray cassettes, top panels and the like; audio goods such as flat speaker panels, speaker cone and the like; sport gears such as heads of golf clubs, face plates, snowboards, windsurfing boards, protectors (American football, baseball, hockey, skiing and the like); general industrial applications such as plate springs, windmill blades, elevator (cage panels, doors) and the like. The plates of the present invention include not only flat plates but also plates having curvatures.

The Fourth Embodiment

The fourth embodiment is described in detail, further about terms used, preferable production conditions and the like.

The fourth embodiment provides an excellent method for producing a fiber-reinforced composite material molding which is of high strength and excellent in design, in a short time by a compression molding method.

(Molding Material Impregnating a Thermosetting Resin in a Substantially Continuous Reinforced Fiber)

The molding material used in the embodiment is a molding material impregnating a thermosetting resin in a substantially continuous reinforced fiber.

The reinforced fibers applicable to the embodiment can use reinforced fibers mentioned in the third embodiment, and preferable examples thereof are also preferable in the embodiment.

The thermosetting resin applied in the fourth embodiment may be of known thermosetting resins used as a matrix resin for FRP, preferably epoxy resins, unsaturated vinylester resins, bismaleimide resins and the like. Of these, epoxy resins which have high mechanical properties after curing and excellent adhesive ability with reinforced fibers, are most preferably used in consideration of mechanical properties of finished molding.

In the embodiment, in place of the molding material described above, it is possible to use a molding material including one material which impregnates a thermosetting resin in a substantially continuous reinforced fiber, disposing other materials which impregnate a thermosetting resin in a staple reinforced fiber, to at least one side thereof to layer therewith. As the material which impregnates a thermosetting resin in a staple reinforced fiber, a material which impregnates the aforementioned thermosetting resin in a reinforced fiber cut in the size of 12 to 50 mm, which is the so-called SMC, can be preferably used.

Since the material which impregnates a thermosetting resin in a staple reinforced fiber, is random in reinforced fiber alignment thereof, in comparison with molding materials in which only substantially continuous reinforced fiber is included, it offers advantages in forming complex shapes having a rib structure or boss structure of FRP; but has disadvantages of inferior mechanical strength. Therefore, by layering both of these and compressing, an FRP which offers advantages of both materials, excellent mechanical strength and complex shape having a rib structure or boss structure, can be obtained.

The thermosetting resin impregnated in the staple reinforced fiber may be the same or different from a thermosetting resin used for the material which impregnates the thermosetting resin in the substantially continuous reinforced fiber.

(Mold)

Figure 2:
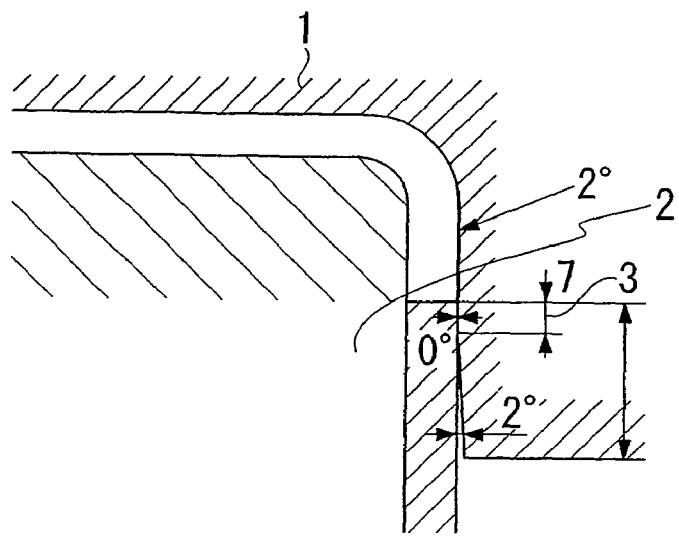
FIG. 2 is a sectional view representing a share edge structure where an upper mold and a lower mold (a male mold and a female mold) come into contact when the mold is being fastened, which is preferably applied to a mold employed in the fourth embodiment of the present invention.

In the method for producing the FRP of the fourth embodiment, preferably used is a mold having a structure which keeps airtightness inside thereof when being fastened. The airtightness required for a mold in the embodiment means that the thermosetting resin constituting molding material does not substantially flow out from the mold, when the mold is poured with a molding material in an amount sufficient for full-filling and is then pressurized. For keeping the inside of the mold airtight, a structure that adopts a share edge structure (refer to the FIG. 2) or rubber sealed structure at the place that the upper mold and lower mold (male mold and female mold) comes into contact when the mold is being fastened is possible. Any known structure may be employed as long as it is able to keep the inside of the mold airtight.

Although air remains in the mold when being fastened, often causing pin holes on the FRP surface or voids in the FRP, the air remaining in the mold can be effectively degassed by employing a mold having a degassing mechanism and degassing with such a mechanism when the entire inside of the mold is being filled with molding material.

The degassing mechanism may be a method for providing openable and closable holes in a mold (refer to the FIG. 3) to open to the outside of the mold, and/or a method for providing a pump to de-pressurize. The degassing is carried out by opening the holes until just the moment of the mold being full-filled with the molding material and then closing when being pressurized.

Figure 3:
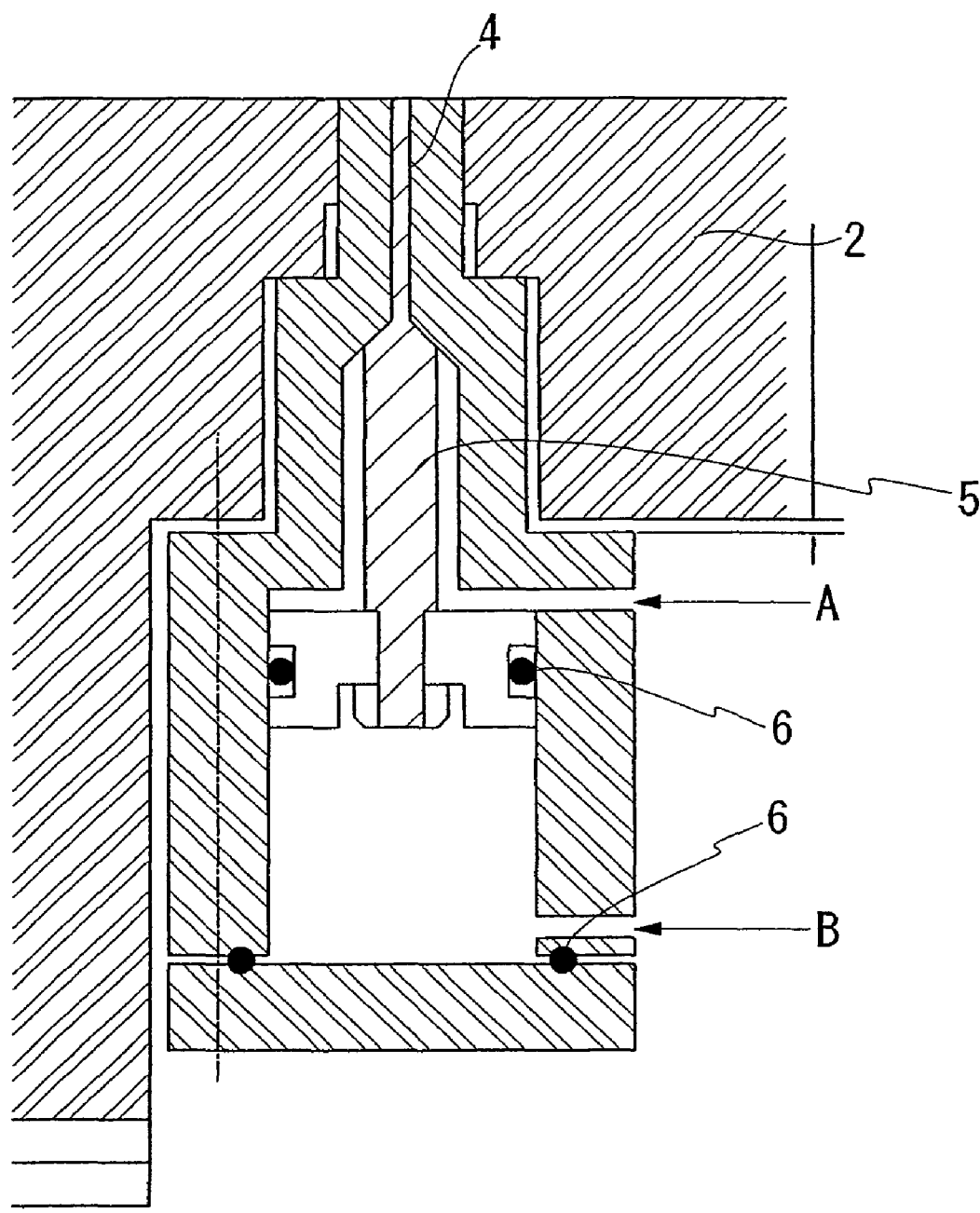
FIG. 3 is a sectional view representing openable and closable holes disposed in a mold which is preferably applied to the mold employed in the fourth embodiment of the present invention; it is possible to use the holes to strip FRP off from the mold by blowing air therethrough.

Furthermore, to easily strip off FRP after finishing FRP molding, it is possible to equip the mold with an FRP stripping mechanism such as an ejector pin or air blow valve (refer to the FIG. 3). With such a mechanism, FRP can be easily stripped without waiting for the mold cool down; this is suitable for mass production. The stripping mechanism may be any of the known arts besides the ejector pin, air blow valve or the like.

(Method for Producing FRP)

A method for producing FRP using the molding material and the mold described above is described by referring to the figures.

FIG. 1A is a view representing a state of a molding material situated in a mold before fastening the mold. Marks exhibited in plurality in the figures of the embodiment respectively represent: 1 represents a female mold; 2, a male mold; 3, a share edge structure; 4, an openable and closable hole; 5, a pin (, which moves up or down by air); 6, a packing; 7, a share edge; A, an air inflow at an opening state; B, an air inflow at an closing state. At first, the mold is heated at least up to a curing temperature of a thermosetting resin of molding material, followed by pouring a molding material in the mold.

Figure 1B:
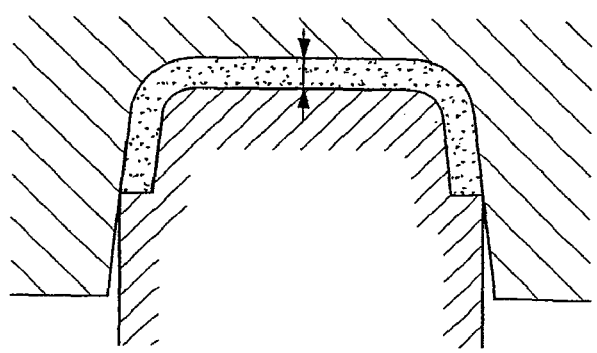
FIG. 1B is a sectional view representing a state of a fastened mold.

Then, by fastening the mold, the molding material is pressurized to mold. FIG. 1B is a view representing a state of fastened mold. As shown in the figure, without the thermosetting resin nearly not flowing out of the mold, the molding material is pressurized to fill the mold entirely.

As for the aforementioned, a bowed filling occurs when prepreg including continuous reinforced fiber being subjected to compression molding, is mainly caused by an excess flow of matrix resin. The embodiment was found to achieve good results in that, in order to suppress resin flow, use of a molding material of which one side surface area being near to the one side surface area of the inside of mold (one side surface area of FRP) when the mold is being fastened; specifically, that a ratio ($S_1/S_2$) of one side surface area $S_1$ of a molding material which impregnates a thermosetting resin in a substantially continuous reinforced fiber, to one side surface area $S_2$ of inside of the mold when being fastened, is 0.8 to 1. If $S_1/S_2$ is less than 0.8, resin flow in the mold becomes turbulent, resulting in a tendency to cause bowed filling. On the other hand, if $S_1/S_2$ is more than 1, margin of the molding material runs over the mold to cause problems of fastening the mold or shortage of molding material in a finished molding, or deterioration of fiber alignment is caused due to folding of molding materials. The one side surface area is a surface area of one of substantially two equal faces which constitute finished molding basically having the thickness thereof.

When particularly high quality FRP is required, it is preferable to use molding material of which the volume and height are near to that of finished molding (a shape of mold inside when being fastened). Each of volume and thickness of the molding material to be put into the mold, is respectively preferably 100 to 120% of volume and 100 to 150% of thickness of the finished molding.

If the volume molding material to be put into the mold is less than 100% of the volume of finished molding, the molding material is not sufficiently pressurized. On the other hand, if it is more than 120%, it is not preferable because the molding material flows out before airtightness is obtained.

If the thickness of the molding material is less than 100% of the thickness of FRP, or more than 150%, it is not preferable because it is difficult to uniformly pressurize the whole surface of the molding material. Herein, the thickness of molding material and the thickness of FRP mean respectively average thickness thereof.

In the embodiment, the aforementioned mold is required to undergo pre-heating equal to or more than the curing temperature of the thermosetting resin. The pre-heating temperature may be an optional temperature selected according to molding conditions other than composition or temperature as long as the optional temperature is equal to or more than the curing temperature determined by composition of the thermosetting resin.

In the method for producing the FRP of the embodiment, the pressure for compression molding is not particularly limited, may be pressures of known compression moldings; may be appropriately determined according to shape of the FRP and the like.

EXAMPLES

The four embodiments of the present invention are specifically described with the following Examples.

Examples of the First Embodiment

In the present Examples and Comparative examples, materials represented by the following abbreviations are used. Average particle size was the value measured by a laser diffractive scattering method. The present embodiment should not be limited to the following Examples.

<Epoxy Resin>

EP828: manufactured by Japan Epoxy Resins CO., LTD, EPIKOTE 828 (registered trade name, bisphenol A type epoxy resin, 120 p/25° C.)

EP807: manufactured by Japan Epoxy Resins CO., LTD, EPIKOTE 807 (registered trade name, bisphenol F type epoxy resin, 30 p/25° C.)

EP604: manufactured by Japan Epoxy Resins CO., LTD, EPIKOTE 604 (registered trade name, glycidylamine type epoxy resin)

N740: manufactured by Dainippon Ink and Chemicals Incorporated, EPICLON N-740 (phenol novolac type epoxy resin, semi-solid)

YCDN701: manufactured by Tohto Kasei Co., Ltd., PHENOTOHTO YCDN701 (cresol novolac type epoxy resin)

FLEP 50: manufactured by Toray Thiokol, epoxy resin, registered trade name

EXA1514: manufactured by Dainippon Ink and Chemicals Incorporated, EPICLON EXA1514 bisphenol S type epoxy resin <Amine Compound Having at Least One Sulfur Atom in the Molecule Thereof>

DDS: manufactured by Wakayama Seika SeikaCure-S (diaminodiphenylsulfon, registered trade name, sulfur atom content 12.9% by mass)

BAPS: manufactured by Wakayama Seika Corporation, BAPS (4,4'-diaminodiphenylsulfide, sulfur atom content 7.4% by mass)

BAPS-M: manufactured by Wakayama Seika Corporation, BAPS-M (bis(4-(3-aminophenoxy)phenyl) sulfon, sulfur atom content 7.4% by mass)

ASD: manufactured by Wakayama Seika Corporation, ASD (4,4'-diaminodiphenylsulfide, sulfur atom content 14.8% by mass)

TSN: manufactured by Wakayama Seika Corporation, TSN (o-tolidinesulfon, sulfur atom content 11.7% by mass)

<Urea Compound>

PDMU: phenyldimethylurea (average particle diameter 50 μm)

DCMU: 3,4-dichlorophenyl-N,N-dimethylurea (average particle diameter 50 μm)

<Dicyanamide>

DICY7: dicyandiamide (average particle diameter 7 μm)

DICY15: dicyandiamide (average particle diameter 15 μm)

DICY1400: dicyandiamide (average particle diameter 20 μm)

<Additive>

PVF: manufactured by Chisso Corporation, Vinylec E (polyvinyl formal)

YP50: manufactured by Tohto Kasei Co., Ltd., PHENOTOHTO YP50

AEROSIL: manufactured by Japan AEROSIL, AEROSIL300

(Evaluation Method)

By using the resin composition of the embodiment, the prepreg was produced by the method describe hereinafter; the Gel time, usable period and mechanical properties thereof were measured. The measuring methods are represented as follows.

(1) Gel Time

A sample of 2 mm square was cut out from a prepreg, followed by sandwiching in between two cover glasses. These were put on a heating plate which was controlled at 130° C.±0.5° C. The time just after putting the sample on was set as the starting time of Gel time measurement. By repeatedly pressing a prepreg with forceps and the like, the state of epoxy resin composition was continually checked to measure the time of gelation completion, followed by setting the time as Gel time. Herein, complete gelation means the state that epoxy resin composition exhibits no flowability when being pressed by forceps.

(2) Usable Period

Leaving a prepreg in a constant temperature dryer under 30±1° C., to observe adhesive ability of the prepreg every day until at most 21 days elapsed; the days that the adhesive ability was lost (the prepreg does not stick), was defined as the usable period.

(Mechanical Property)

A prepreg was molded by a vacuum bag molding to form a flat plate fiber-reinforced composite material of a length 200 mm×breadth 200 mm×thickness 150 mm. The bending strengths at 0° and 90° of the flat plate were measured according to ASTM D 790.

(Content of Sulfur Atom)

A sulfur atom content S, when component A did not contain a sulfur atom, was obtained by letting X be the total sum of mass parts of the component A, component C, component D and additives added, letting Y be the mass part of component B-1 used in the production of an epoxy resin composition, and letting p be the sulfur atom content (% by mass) in the component B-1 used in the production of an epoxy resin composition, according to the following formula.

$$S(\% \text{ by mass}) = pY/(X+Y)$$

When component A contained a sulfur atom, it was directly measured from an epoxy resin composition by the following atomic absorption method. That is, after an epoxy resin composition was produced, 50 mg of the epoxy resin composition was decomposed in aqueous nitric acid solution, followed by dilution of the solution with ion-exchanged water to become a 50 ml solution, and then the solution was used as a sample for measurement.

Of the sample, sulfur atom concentration was measured by the atomic absorption method by employing the high-frequency plasma emission spectrometry device (manufactured by Japan Jarrel Ash, ICAP-575 MK-II), (measurement conditions; plasma gas: 0.8 L/min, coolant gas: 16 L/min, carrier gas: 0.48 L/min, measuring wave length: 180.7 nm). The sulfur atom concentration in the aqueous solution was obtained using a pre-determined calibration curve, followed by calculation of a sulfur atom content (% by mass) in the epoxy resin composition from the sulfur atom concentration.

Examples 1 to 10

Each of the epoxy resin compositions was prepared by mixing to be uniform in the composition ratio shown in the Table 1. The epoxy resin composition was uniformly coated by a handy roll coater on an exfoliate paper with resin weight per unit area of 33.7 g/m² to form a resin layer. The resin layer was stuck on both sides of the sheet of carbon fiber manufactured by MITSUBISHI RAYON CO., LTD., (TR50S, tensile elasticity: 240 GPa) unidirectionally drawn to be fiber weight per unit area thereof of 125 g/m², followed by impregnating the epoxy resin composition in the carbon fiber by heating and pressing with a roller under 100° C. and line pressure of 2 kg/cm to form a prepreg having fiber weight per unit area thereof of 125 g/m² (resin content being 35% by mass).

Gel times and usable periods of prepregs obtained from the epoxy resin composition of the Examples 1 to 10, were evaluated at 130° C.; every Gel time was equal to or less than 200 seconds respectively and adhesive ability was respectively retained after 21 days of the usable period elapsed; consequently the usable periods equal to or more than 21 days were confirmed.

The flat plate composite properties were over 160 kg/mm² in bending strength at 0° and 10 kg/mm² in bending strength at 90°, which exhibited favorable physical properties.

Examples 11 to 20

Except for being prepared by mixing to be uniform in the composition ratio shown in the Table 2, prepregs were produced and evaluated in the same manner as performed in the Example 1.

The prepregs obtained from the epoxy resin compositions of the Example 11 to 20, also had a respective Gel time equal to or less than 200 seconds and confirmed the respective usable period equal to or more than 21 days.

The flat plate composite properties (FRP plate physical properties) were respectively over 160 kg/mm$^2$ in bending strength at 0° and 10 kg/mm$^2$ in bending strength at 90°, which exhibited favorable physical properties.

Example 21

Of the composition shown in the Example 21 of Table 3, the epoxy resin as component B and the amine component (DDS) were mixed at room temperature, followed by heating up to 150° C. to partially react to adjust viscosity at 90° C. thereof being 30 to 90 poise (component B-2). The reactant, the component A and components C and D were mixed to be uniform in the composition ratio shown in the Example 21 of the Table 3, to prepare an epoxy resin composition. The epoxy resin composition was uniformly coated by a handy roll coater on an exfoliate paper with a resin weight per unit area of 33.7 g/m$^2$ to form a resin layer. The resin layer was stuck on both sides of the sheet of carbon fiber manufactured by MITSUBISHI RAYON CO., LTD., (TR50S, tensile elasticity: 240 GPa) unidirectionally drawn to be fiber weight per unit area thereof of 125 g/m$^2$, followed by impregnating the epoxy resin composition in the carbon fiber by heating and pressing with a roller under 100° C. and line pressure of 2 kg/cm to form a prepreg having a fiber weight per unit area thereof of 125 g/m$^2$ (resin content being 35% by mass).

Gel time and usable period of prepreg obtained from the epoxy resin composition of the Examples 21, was evaluated at 130° C.; the Gel time was equal to or less than 200 seconds respectively and adhesive ability was retained after 21 days of the usable period elapsed; consequently the usable period equal to or more than 21 days was confirmed.

The flat plate composite properties were over 160 kg/mm$^2$ in bending strength at 0° and 10 kg/mm$^2$ in bending strength at 90°, which exhibited favorable physical properties.

Examples 22 to 31

Of composition ratio shown in Table 3, the epoxy resin as component A and the amine component (DDS) were mixed at room temperature, followed by heating up to 150° C. to partially react to adjust viscosity at 90° C. thereof being 30 to 90 poise. Except for the reactant, the component B and component C were mixed to be uniform in the composition ratio shown in Table 3, prepregs were produced and evaluated in a same manner performed in Example 21.

The prepregs obtained from the epoxy resin compositions of the Example 22 to 31, also had respective Gel time equal to or less than 200 seconds and confirmed the respective usable period equal to or more than 21 days.

The flat plate composite properties were respectively over 160 kg/mm$^2$ in bending strength at 0° and 10 kg/mm$^2$ in bending strength at 90°, which exhibited favorable physical properties.

Examples 32 to 45

Of compositions shown in Table 4, the epoxy resin as component A and the amine component were mixed at room temperature, followed by heating up to 150° C. to partially react to adjust viscosity at 90° C. thereof being 30 to 90 poise. Except for the reactant, the component B and component C were mixed to be uniform in the composition ratio shown in Table 4, prepregs were produced and evaluated in the same manner performed in the Example 21.

The prepregs obtained from the epoxy resin compositions of the Examples 32 to 45, also had a respective Gel time equal to or less than 200 seconds and confirmed respective usable period equal to or more than 21 days.

Comparative Examples 1 to 8

Except for being mixed to be uniform in the composition ratio shown in the Table 5, prepregs were produced and evaluated in the same manner performed in the Example 1.

As for the results, cases except the Comparative Examples 2, 4 and 6, were respectively more than 200 seconds in Gel time thereof, or did not complete curing thereof in several hours. Although Comparative Examples 2, 4 and 6, developed fast curing ability such as being equal to or less than 200 seconds in Gel time thereof, their usable periods were short such as being equal to or less than 5 days.

Comparative Examples 9 to 10

Except for being mixed to be uniform in the composition ratio shown in Table 3, prepregs were produced and evaluated in the same manner performed in the Example 21.

As for the results, the Comparative Examples 9 and 10 which did not contain dicyandiamide, even though they were composed of the same amount of curing agents in sum thereof to that of the Example 21 or the Example 24, produced were only flat plate composites of which the bending strength at 0° being about 10% inferior to the flat plate composites produced in each Example. Moreover, in the Comparative Example 10, the usable period of prepregs produced was short such as being equal to or less than 5 days.

As described in detail above, the epoxy resin compositions of the embodiment can cure in a short time at relatively low temperature. Consequently, the obtained effect is that the prepregs obtained by using the epoxy resin composition have a sufficient usable period under preservation at room temperature, and that the composite obtained from the prepregs develops excellent mechanical properties. Furthermore, by using the prepregs, the processing time can be reduced in molding the fiber-reinforced composite material, resulting in having proved that production at low cost is possible.

TABLE 1

| Component | | Resin name | Example 1 | Example 2 | Example 3 | Example 4 | Example 5 | Example 6 |
|---|---|---|---|---|---|---|---|---|
| Component A | Epoxy resin | Ep828 | 86 | 84 | 82 | 78 | 68 | |
| [mass | | Ep807 | | | | | | 86 |
| parts] | | N740 | | | | | | |
| | | FLEP50 | | | | | | |
| | | EXA1514 | | | | | | |

TABLE 1-continued

| Component | | Resin name | | | | | | |
|---|---|---|---|---|---|---|---|---|
| Component B [mass parts] | Amine compound having sulfur atom | DDS | 2 | 4 | 6 | 10 | 20 | 2 |
| | | BAPS | | | | | | |
| | | BAPS-M | | | | | | |
| | | ASD | | | | | | |
| | | TSN | | | | | | |
| Component C [mass parts] | Urea compound | PDMU | 5 | 5 | 5 | 5 | 5 | |
| | | DCMU | | | | | | 5 |
| Component D [mass parts] | Dicyandiamide | DICY1400 | | | | | | 7 |
| | | DICY15 | | | | | | |
| | | DICY7 | 7 | 7 | 7 | 7 | 7 | |
| Additive [mass parts] | | Vinylec E | | | | | | |
| | | YP50 | | | | | | |
| | | AEROSIL300 | | | | | | |
| Sulfur atom content (%) | | | 0.26 | 0.52 | 0.77 | 1.29 | 2.58 | 0.26 |
| Gel time (S) | | | 190 | 170 | 160 | 155 | 150 | 190 |
| Usable period | | Day | 21> | 21> | 21> | 21> | 21> | 21> |
| Mechanical property | | Bending test at 0° (kg/mm) | 168 | 173 | 175 | 170 | 172 | 171 |
| | | Bending test at 90° (kg/mm) | 12.6 | 12.4 | 12.4 | 12.3 | 13.9 | 13.1 |

| Component | | Resin name | Example 7 | Example 8 | Example 9 | Example 10 | Example 44 | Example 45 |
|---|---|---|---|---|---|---|---|---|
| Component A [mass parts] | Epoxy resin | Ep828 | | | | | | 33 |
| | | Ep807 | 68 | 34 | 70 | 61 | | |
| | | N740 | | | | | 43 | |
| | | FLEP50 | | | | | 30 | |
| | | EXA1514 | | | | | | 40 |
| Component B [mass parts] | Amine compound having sulfur atom | DDS | 20 | 54 | 20 | 20 | 10 | 10 |
| | | BAPS | | | | | | |
| | | BAPS-M | | | | | | |
| | | ASD | | | | | | |
| | | TSN | | | | | | |
| Component C [mass parts] | Urea compound | PDMU | | | | | | |
| | | DCMU | 5 | 5 | 3 | 12 | 10 | 10 |
| Component D [mass parts] | Dicyandiamide | DICY1400 | | | 7 | 7 | | |
| | | DICY15 | 7 | 7 | | | | |
| | | DICY7 | | | | | 7 | 7 |
| Additive [mass parts] | | Vinylec E | | | | | | |
| | | YP50 | | | | | | |
| | | AEROSIL300 | | | | | | |
| Sulfur atom content (%) | | | 2.58 | 6.98 | 2.58 | 2.58 | 6.5 | 6.1 |
| Gel time (S) | | | 155 | 130 | 170 | 160 | 190 | 190 |
| Usable period | | Day | 21> | 21> | 21> | 21> | 21> | 21> |
| Mechanical property | | Bending test at 0° (kg/mm) | 164 | 163 | 170 | 175 | 167 | 170 |
| | | Bending test at 90° (kg/mm) | 13.7 | 13.5 | 14.5 | 14.5 | 13.5 | 14.0 |

TABLE 2

| Component | | Resin name | Example 11 | Example 12 | Example 13 | Example 14 | Example 15 | Example 16 | Example 17 | Example 18 | Example 19 | Example 20 |
|---|---|---|---|---|---|---|---|---|---|---|---|---|
| Component A | Epoxy resin | Ep828 | | | | | 77 | 77 | 77 | 77 | 77 | |
| | | Ep807 | 58 | | | | | | | | | |
| | | N740 | | 70 | | | | | | | | |
| | | YCDN701 | | | 70 | | | | | | | |
| | | Ep604 | | | | 70 | | | | | | 54 |
| Component B | Amine compound having sulfur atom | DDS | 20 | | | | 10 | | | | | 30 |
| | | BAPS | | 20 | 20 | 20 | | 10 | | | | |
| | | BAPS-M | | | | | | | 10 | | | |
| | | ASD | | | | | | | | 10 | | |
| | | TSN | | | | | | | | | 10 | |
| Component C | Urea compound | PDMU | | 5 | 5 | 5 | | | | | | 5 |
| | | DCMU | 15 | | | | 5 | 5 | 5 | 5 | 5 | |
| Component D | Dicyandiamide | DICY1400 | 7 | | | | | | | | | |
| | | DICY15 | | 5 | 5 | 5 | 5 | 5 | | | | |
| | | DICY7 | | | | | | | 5 | 5 | 5 | 5 |
| | Additive | Vinylec E | | | | | 3 | 3 | 3 | | | 3 |
| | | YP50 | | | | | | | | 3 | 3 | |
| | | AEROSIL300 | | | | | | | | | | 3 |
| Sulfur atom content (%) | | | 2.58 | 1.48 | 1.48 | 1.48 | 1.29 | 1.29 | 1.29 | 1.48 | 1.17 | 3.87 |

TABLE 2-continued

| Component | Resin name | Example 11 | Example 12 | Example 13 | Example 14 | Example 15 | Example 16 | Example 17 | Example 18 | Example 19 | Example 20 |
|---|---|---|---|---|---|---|---|---|---|---|---|
| Gel time (S) | | 155 | 180 | 170 | 155 | 165 | 170 | 176 | 175 | 180 | 160 |
| Usable period | Day | 21> | 21> | 21> | 21> | 21> | 21> | 21> | 21> | 21> | 21> |
| Mechanical property | Bending test at 0° (kg/mm) | 168 | 166 | 164 | 164 | 168 | 171 | 165 | 167 | 166 | 172 |
| | Bending test at 90° (kg/mm) | 12.4 | 12.1 | 12.5 | 12.4 | 12.5 | 12.7 | 12.5 | 12.2 | 12.3 | 12.9 |

TABLE 3

| | | Resin name | Example 21 | Example 22 | Example 23 | Example 24 | Example 25 | Example 26 | Example 27 |
|---|---|---|---|---|---|---|---|---|---|
| Component | | | | | | | | | |
| Component A | Epoxy resin | Ep828 | 5 | 5 | 5 | 5 | 5 | | |
| | | Ep807 | | | | | | 5 | 5 |
| | | N740 | | | | | | | |
| | | YCDN701 | | | | | | | |
| | | Ep604 | | | | | | | |
| Component B-2 | Epoxy resin Amine compound having sulfur atom | Ep828 | 81 | 79 | 77 | 73 | 63 | | |
| | | Ep807 | | | | | | 81 | 63 |
| | | N740 | | | | | | | |
| | | YCDN701 | | | | | | | |
| | | Ep604 | | | | | | | |
| | | DDS | 2 | 4 | 6 | 10 | 20 | 2 | 20 |
| | | BAPS | | | | | | | |
| | | BAPS-M | | | | | | | |
| | | ASD | | | | | | | |
| | | TSN | | | | | | | |
| Component C | Urea compound | PDMU | 5 | 5 | 5 | 5 | 5 | | |
| | | DCMU | | | | | | 5 | 5 |
| Component D | Dicyandiamide | DICY1400 | | | | | | | |
| | | DICY15 | | | | | | 7 | 7 |
| | | DICY7 | 7 | 7 | 7 | 7 | 7 | | |
| Additive | | Vinylec E | | | | | | | |
| | | YP50 | | | | | | | |
| | | AEROSIL300 | | | | | | | |
| Evaluation result | | | | | | | | | |
| Sulfur atom content (%) | | | 0.26 | 0.52 | 0.77 | 1.29 | 2.58 | 0.26 | 2.58 |
| Gel time (S) | | | 185 | 165 | 150 | 150 | 140 | 180 | 145 |
| Usable period | | Day | 21> | 21> | 21> | 21> | 21> | 21> | 21> |
| Mechanical property | | Bending test at 0° (kg/mm) | 175 | 172 | 172 | 169 | 168 | 171 | 166 |
| | | Bending test at 90° (kg/mm) | 13.1 | 12.9 | 12.3 | 12.5 | 12.7 | 12.6 | 12.4 |

| | | Resin name | Example 28 | Example 29 | Example 30 | Example 31 | Comparative example 9 | Comparative example 10 |
|---|---|---|---|---|---|---|---|---|
| Component | | | | | | | | |
| Component A | Epoxy resin | Ep828 | | | | | 5 | |
| | | Ep807 | 5 | 5 | 5 | 5 | | 5 |
| | | N740 | | | | | | |
| | | YCDN701 | | | | | | |
| | | Ep604 | | | | | | |
| Component B-2 | Epoxy resin Amine compound having sulfur atom | Ep828 | | | | | 77 | |
| | | Ep807 | 29 | 65 | 56 | 53 | | 56 |
| | | N740 | | | | | | |
| | | YCDN701 | | | | | | |
| | | Ep604 | | | | | | |
| | | DDS | 54 | 20 | 20 | 20 | 6 | 20 |
| | | BAPS | | | | | | |
| | | BAPS-M | | | | | | |
| | | ASD | | | | | | |
| | | TSN | | | | | | |
| Component C | Urea compound | PDMU | | | | | 5 | |
| | | DCMU | 5 | 3 | 12 | 15 | | 12 |
| Component D | Dicyandiamide | DICY1400 | | 7 | 7 | 7 | | |
| | | DICY15 | | | | | | |
| | | DICY7 | 7 | | | | | |
| Additive | | Vinylec E | | | | | | |
| | | YP50 | | | | | | |
| | | AEROSIL300 | | | | | | |

TABLE 3-continued

| Evaluation result | | | | | | | |
|---|---|---|---|---|---|---|---|
| Sulfur atom content (%) | | 6.98 | 2.58 | 2.58 | 2.58 | 0.77 | 2.58 |
| Gel time (S) | | 100 | 145 | 150 | 145 | 230 | 225 |
| Usable period | Day | 21> | 21> | 21> | 21> | 21> | 4 |
| Mechanical property | Bending test at 0° (kg/mm) | 168 | 174 | 168 | 169 | 150 | 155 |
| | Bending test at 90° (kg/mm) | 12.4 | 12.9 | 13.2 | 12.5 | 10.0 | 10.0 |

TABLE 4

| Component | | Resin name | Example 32 | Example 33 | Example 34 | Example 35 | Example 36 | Example 37 |
|---|---|---|---|---|---|---|---|---|
| Component A | Epoxy resin | Ep828 | | | | 5 | 5 | 5 |
| | | Ep807 | | | | | | |
| | | N740 | 5 | | | | | |
| | | YCDN701 | | 5 | | | | |
| | | Ep604 | | | 5 | | | |
| Component B-2 | Epoxy resin Amine compound having sulfur atom | Ep828 | | | | 72 | 72 | 72 |
| | | Ep807 | 65 | | | | | |
| | | N740 | | 65 | | | | |
| | | YCDN701 | | | 65 | | | |
| | | Ep604 | | | | | | |
| | | DDS | | | | 10 | | |
| | | BAPS | 20 | 20 | 20 | | 10 | |
| | | BAPS-M | | | | | | 10 |
| | | ASD | | | | | | |
| | | TSN | | | | | | |
| Component C | Urea compound | PDMU | 5 | 5 | 5 | | | |
| | | DCMU | | | | 5 | 5 | 5 |
| Component D | Dicyandiamide | DICY1400 | | | | | | |
| | | DICY15 | 5 | 5 | 5 | 5 | 5 | |
| | | DICY7 | | | | | | 5 |
| | Additive | Vinylec E | | | | 3 | 3 | 3 |
| | | YP50 | | | | | | |
| | | AEROSIL3 | | | | | | |
| Sulfur atom content (%) | | | 2.58 | 2.58 | 2.58 | 1.29 | 1.29 | 1.29 |
| Gel time (S) | | | 170 | 160 | 145 | 160 | 160 | 170 |
| Usable period | Day | | 21> | 21> | 21> | 21> | 21> | 21> |
| Mechanical property | Bending test at 0° (kg/mm) | | 164 | 172 | 175 | 170 | 172 | 164 |
| | Bending test at 90° (kg/mm) | | 12.2 | 12.4 | 12.3 | 11.9 | 12.6 | 12.4 |

| Component | | Resin name | Example 38 | Example 39 | Example 40 | Example 41 | Example 42 | Example 43 |
|---|---|---|---|---|---|---|---|---|
| Component A | Epoxy resin | Ep828 | 5 | 5 | | 5 | 5 | 5 |
| | | Ep807 | | | | | | |
| | | N740 | | | | | | |
| | | YCDN701 | | | | | | |
| | | Ep604 | | | 5 | | | |
| Component B-2 | Epoxy resin Amine compound having sulfur atom | Ep828 | 72 | 72 | | 75 | 68 | 63 |
| | | Ep807 | | | | | | |
| | | N740 | | | | | | |
| | | YCDN701 | | | | | | |
| | | Ep604 | | | 49 | | | |
| | | DDS | | | 30 | 10 | 10 | 10 |
| | | BAPS | | | | | | |
| | | BAPS-M | | | | | | |
| | | ASD | 10 | | | | | |
| | | TSN | | 10 | | | | |
| Component C | Urea compound | PDMU | | | 5 | 3 | 10 | 15 |
| | | DCMU | 5 | 5 | | | | |
| Component D | Dicyandiamide | DICY1400 | | | | | | |
| | | DICY15 | | | | | | |
| | | DICY7 | 5 | 5 | 5 | 7 | 7 | 7 |
| | Additive | Vinylec E | | | 3 | | | |
| | | YP50 | 3 | 3 | | | | |
| | | AEROSIL3 | | | 3 | | | |

TABLE 4-continued

| | | | | | | | |
|---|---|---|---|---|---|---|---|
| Sulfur atom content (%) | | 1.29 | 1.29 | 2.58 | 1.29 | 1.29 | 1.29 |
| Gel time (S) | | 175 | 175 | 150 | 180 | 160 | 140 |
| Usable period | Day | 21> | 21> | 21> | 21> | 21> | 21> |
| Mechanical property | Bending test at 0° (kg/mm) | 169 | 168 | 177 | 172 | 175 | 173 |
| | Bending test at 90° (kg/mm) | 12.3 | 12.7 | 12.0 | 13.1 | 12.8 | 12.9 |

TABLE 5

| Component | | Resin name | Comparative example 1 | Comparative example 2 | Comparative example 3 | Comparative example 4 | Comparative example 5 | Comparative example 6 | Comparative example 7 | Comparative example 8 |
|---|---|---|---|---|---|---|---|---|---|---|
| Component A | Epoxy resin | Ep828 | 87 | 33 | | 57 | | | 75 | 70 |
| | | Ep807 | | | 72.1 | | 72.1 | 57 | | |
| Component B-1 | Amine compound having sulfur atom | DDS | 1 | 55 | 20 | 20 | | | 20 | 20 |
| | | BAPS | | | | | | | | |
| | | BAPS-M | | | | | | | | |
| | | ASD | | | | | 20 | 20 | | |
| | | TSN | | | | | | | | |
| Component C | Urea compound | PDMU | 5 | 5 | 0.9 | 16 | | | | |
| | | DCMU | | | | | 0.9 | 16 | 5 | 10 |
| Component D | Dicyandiamide | DICY1400 | 7 | 7 | 7 | 7 | | | | |
| | | DICY15 | | | | | 7 | 7 | | |
| | | DICY7 | | | | | | | | |
| Sulfur atom content (%) | | | 0.13 | 7.10 | 2.58 | 2.58 | 2.96 | 2.96 | 2.58 | 2.58 |
| Gel time (S) | | | 250 | 170 | — | 160 | — | 160 | 250 | 250 |
| Usable period | Day | | 21> | 5 | 21> | 4 | 21> | 4 | 21> | 21> |
| Mechanical property | Bending testat 0° (kg/mm) | | 155 | 173 | 168 | 159 | 169 | 161 | 164 | 163 |
| | Bending test at 90° (kg/mm) | | 12.0 | 12.3 | 12.4 | 12.3 | 12.2 | 13.1 | 13.7 | 13.5 |

"—" in Gel time row means that epoxy resin did not gelate.

Examples of the Second Embodiment

The second embodiment is described in detail referring the Examples. The embodiment should not be limited to the following examples.

As raw materials for thermosetting resin composition, the following epoxy resins and curing agents were prepared.
<Epoxy Resin>
EP828:
manufactured by Japan Epoxy Resins CO., LTD., liquid type bisphenol A type epoxy resin, "EPIKOTE828 (registered trade name)"
EP1009:
manufactured by Japan Epoxy Resins CO., LTD, solid type bisphenol A type epoxy resin, "EPIKOTE1009 (registered trade name)"
AER4152:
manufactured by Asahi Kasei Corporation, epoxy resin, "Araldite AER4152 (registered trade name)"
N740:
manufactured by Dainippon Ink and Chemicals Incorporated, phenol novolac type epoxy resin, "EPICLON N740 (registered trade name)"
<Curing Agent>
HX3722:
manufactured by Asahi Kasei Corporation, microcapsule type latent curing agent, "Novacure HX3722 (registered trade name)"
FXE1000:
manufactured by FUJI KASEI KOGYO CO., LTD., latent curing agent for epoxy resin, "FUJICURE FXE1000"
PDMU:
manufactured by PTI Japan LTD., phenyldimethylurea, "OMICURE94 (registered trade name)"
DCMU:
manufactured by HODOGAYA CHEMICAL CO., LTD., 3,4-dichlorophenyl-N,N-dimethyurea, "DCMU99"
Dicy:
manufactured by Japan Epoxy Resins CO., LTD., dicyandiamide, "Dicy7"
2P4MZ:
manufactured by SHIKOKU CORPORATION, 2-phenyl-4-methylimidazole
<Viscosity Measurement>
Device: manufactured by Rheometrix, RDS-200
Measurement mode: parallel plates (25 mmφ, gap 0.5 mm)
Frequency: 1 Hz
Temperature setting: raising from 50° C. at a rate of 10° C./minute, isothermal viscosity was measured after having reached to 120° C.
Measured data: viscosity at 50° C., time that viscosity exceeds $10^2$ Pa·sec after having reached 120° C. In the Examples, it has been confirmed that the viscosity after having reached 120° C. in every thermosetting resin composition, was equal to or less than $10^1$ Pa·sec.
<Viscosity Increase after 30° C.×3 Weeks>
Sampling a thermosetting resin composition at just after being prepared, followed by measurement of viscosity $\eta_0$ at 50° C. by the viscosity measuring method described above; the same thermosetting resin composition was left in a drier under 30° C. for 3 weeks to provide thermal hysteresis, followed by measurement of viscosity by the same manner to obtain viscosity $\eta_1$ at 50° C. Viscosity increase was obtained from $\eta_0/\eta_1$.
<Preparation of Prepreg>
Heating a thermosetting resin composition to 50° C. to decrease viscosity thereof, followed by preparation of a hotmelt film by thinly coating it on an exfoliate paper; and then impregnating the resultant in a woven carbon fiber manufactured by MITSUBISHI RAYON CO., LTD. TR3110 to obtain a prepreg. Amount of resin contained was adjusted to 30% by mass.

<Molding>

Layering prepreg 11 ply in the same direction, followed by molding using a mold having a share edge by a heating pressing device under molding pressure of 2 MPa. Thickness of molded plate was about 2 mm.

<Measurement of Mechanical Properties>

By employing a universal testing machine manufactured by Instron Corporation, a bending test was carried out according to ASTM D790, and an interlayer shearing test (ILSS) was carried out according to ASTM D2344.

Examples 46 to 50

After preparing a thermosetting resin composition in the composition shown in Table 6, a viscosity at 50° C. and a viscosity at 50° C. after 30° C.×3 weeks, were measured. The time that viscosity had exceeded $10^2$ Pa·sec after having reached 120° C., was measured. Producing a prepreg, and handling ability thereof was evaluated by tactile impression. Ones for which tackiness and draping ability was suitable for easy handling, were represented by "O" and ones which were difficult to handle were represented by "X" After the prepared prepreg was left for 30° C.×3 weeks, handling ability thereof was also evaluated in the same manner. Furthermore, the prepreg was molded by the method described above. Molding was carried out in three conditions of 120° C.×15 minutes, 120° C.×10 minutes, and 140° C.×4 minutes, followed by measurement of mechanical properties for each condition. The results were also exhibited in Table 6. The thermosetting resin compositions represented in the Examples were good in both handling ability of prepreg just after preparation and handling ability of prepreg after having elapsed at 30° C. for 3 weeks after preparation. The appearance of the surface after molding was good, and mechanical properties were also favorable.

Comparative Example 13

Case of Viscosity at 50° C. being Low

A thermosetting resin composition was prepared in the composition shown in Table 7. Since the viscosity at 50° C. was less than $5\times10^1$ Pa·sec, the prepreg just after preparation was too tacky and sticky to handle.

Comparative Example 14

Case of Viscosity at 50° C. being High

A thermosetting resin composition was prepared in the composition shown in Table 7. Since the viscosity at 50° C. was more than $1\times10^4$ Pa·sec, the thermosetting resin composition was too hard to make it filmed.

Comparative Example 15

Case of Viscosity Increase after 30° C.×3 Weeks being More than Two Times

A thermosetting resin composition was prepared in the composition shown in Table 7. The thermosetting resin composition after elapsing at 30° C.×3 weeks, was too hard to measure viscosity thereof. Although the handling ability of prepreg just after preparation was good, the state after being left for 3 weeks, was very hard as if life thereof was cut off.

Comparative Example 16

Case of Time Having Reached to $10^6$ Pa·Sec at 120° C. being More than 1000 Seconds A thermosetting resin composition was prepared in the composition shown in Table 7. Since the time having reached to $10^6$ Pa·sec at 120° C., was long such as 1300 seconds, it is clearly inferior in curing ability to the Examples. Since it was not broken by a bending test, it was represented as "unmeasurable."

As described above, the thermosetting resin composition of the embodiment can provide a thermosetting resin composition suitable for a matrix resin for a prepreg which can retain handling ability at room temperature, long life at room temperature and favorable properties after molding, and have high speed molding required for industrial applications.

As described above, the prepreg of the embodiment allows high speed molding required for industrial applications, by retaining handling ability at room temperature, long life at room temperature and favorable properties after molding.

Consequently, it has been proved that any of the thermosetting resin compositions, prepreg and the method for producing FRP of the embodiment, are very suitable for high speed molding, and contribute to cost savings for molding which has been the greatest drawback of FRP.

TABLE 6

|  |  |  | Example 46 | Example 47 | Example 48 | Example 49 | Example 50 |
|---|---|---|---|---|---|---|---|
| Composition | Ep828 | parts | 40 | 40 | 60 | 60 | 60 |
|  | Ep1009 | parts | 20 | 20 | 20 | 20 | 20 |
|  | AER4152 | parts |  |  | 20 | 20 | 20 |
|  | N740 | parts | 40 | 40 |  |  |  |
|  | FXE1000 | parts | 5 |  |  |  |  |
|  | HX3722 | parts |  |  |  | 5 | 10 |
|  | Dicy | parts | 5 | 5 | 5 | 5 | 5 |
|  | DCMU | parts |  | 15 |  |  |  |
|  | PDMU | parts | 5 |  | 10 | 5 | 5 |
| Viscosity at 50° C. |  | Pa·sec | 350 | 380 | 280 | 260 | 230 |
| Handling ability of prepreg just after preparation |  | O/X | O | O | O | O | O |
| Viscosity increase after 30° C. × 3 weeks |  | times | 1.5 | 1.7 | 1.4 | 1.4 | 1.5 |
| Handling ability of prepreg after 3 weeks elapsed after preparation |  | O/X | O | O | O | O | O |

TABLE 6-continued

|  |  | Example 46 | Example 47 | Example 48 | Example 49 | Example 50 |
|---|---|---|---|---|---|---|
| Time having reached to $10^6$ Pa · sec at 120° C. | sec | 530 | 950 | 900 | 780 | 520 |
| Bending strength of 120° C. × 15 minutes molding | Mpa | 1200 | 1100 | 1100 | 1200 | 1200 |
| Same ILSS | Mpa | 74 | 72 | 73 | 73 | 73 |
| Bending strength of 120° C. × 10 minutes molding | Mpa | 1100 | 770 | 820 | 950 | 1200 |
| Same ILSS | Mpa | 74 | 65 | 68 | 70 | 74 |
| Bending strength of 140° C. × 5 minutes molding | Mpa | 1200 | 1200 | 1200 | 1200 | 1200 |
| Same ILSS | Mpa | 75 | 73 | 74 | 72 | 74 |

TABLE 7

|  |  |  | Comparative example 13 | Comparative example 14 | Comparative example 15 | Comparative example 16 |
|---|---|---|---|---|---|---|
| Composition | Ep828 | parts | 50 | 30 | 40 | 60 |
|  | Ep1009 | parts | 10 | 40 | 20 | 20 |
|  | AER4152 | parts |  |  |  | 20 |
|  | N740 | parts | 40 | 30 | 40 |  |
|  | FXE1000 | parts | 5 | 5 |  |  |
|  | Dicy | parts | 5 | 5 | 5 | 5 |
|  | PDMU | parts | 5 | 5 |  | 7 |
|  | 2P4MZ | parts |  |  | 5 |  |
| Viscosity at 50° C. |  | Pa · sec | 45 | 15000 | 340 | 270 |
| Handling ability of prepreg just after preparation |  | ○/X | X | ○ | ○ |  |
| Viscosity increase after 30° C. × 3 weeks |  | times | 1.3 |  | ∞ | 1.4 |
| Handling ability of prepreg after 3 weeks elapsed after preparation |  | ○/X | ○ | X | ○ |  |
| Time having reached to $10^6$ Pa · sec at 120° C. |  | sec | 620 |  | 960 | 1300 |
| Bending strength of 120° C. × 15 minutes molding |  | Mpa | 1200 |  | 1100 | unmesurable |
| Same ILSS |  | Mpa | 73 |  | 72 | 35 |
| Bending strength of 120° C. × 10 minutes molding |  | Mpa | 1200 |  | 780 | unmesurable |
| Same ILSS |  | Mpa | 72 |  | 66 | 22 |
| Bending strength of 140° C. × 5 minutes molding |  | Mpa | 1100 |  | 1200 | unmesurable |
| Same ILSS |  | Mpa | 74 |  | 73 | 42 |

Examples of the Third Embodiment

The third embodiment is described in detail referring to the following Examples. The embodiment should not be limited to the following examples.

"Example by Resin Composition (1)"

The Examples 1 to 20 represented in the first embodiment, satisfy conditions required by the embodiment. The first embodiment stated that the Examples 1 to 20 exhibited an excellent result, the statement has proved that epoxy resin compositions and prepregs provided by the embodiment have excellent properties. On the other hand, the Comparative Examples 1 to 8 represented in the first embodiment, do not satisfy conditions required by the embodiment. Therefore, it has been proved that none of the Comparative Examples 1 to 8 can exhibit excellent properties of the Examples 1 to 20.

Example 51

The epoxy resin composition obtained in the Example 3 of the first embodiment was uniformly coated by a handy roll coater on an exfoliate paper with a resin weight per unit area of 26.8 g/m² to form a resin layer. The resin layer was adhered on both sides of the sheet of carbon fiber manufactured by MITSUBISHI RAYON CO., LTD., (TR50S, tensile elasticity: 240 GPa) unidirectionally drawn to be a fiber weight per unit area thereof of 125 g/m², followed by impregnating the epoxy resin composition in the carbon fiber by heating and pressing with a roller under 100° C. and a line pressure of 2 kg/cm to form a prepreg having a fiber weight per unit area thereof of 125 g/m² (resin content being 30% by mass).

Separately, the epoxy resin composition obtained in the Example 3 was uniformly coated by a handy roll coater on an exfoliate paper with a resin weight per unit area of 164 g/m² to form a resin layer. The resin layer was adhered on one side of the woven carbon fiber TR3110 manufactured by MITSUBISHI RAYON CO., LTD., (which was a fabric (weight per unit area thereof of 200 g/m²) of TR30S3L (filament number of 3000 lines) woven plain in a weaving density of 12.5 line/inch), followed by impregnating the epoxy resin composition in the carbon fiber by heating and pressing with a roller under 100° C. and a line pressure of 2 kg/cm to form a cloth prepreg having a fiber weight per unit area thereof of 200 g/m² (resin content being 45% by mass).

Cutting out the prepreg and the cloth prepreg in a size of 200×200 mm, followed by layering a total of 16 sheets of prepreg in a manner of fiber direction thereof being 0°/90°/0°/90°/0°/90°/0°/90°/0°/90°/0°/90°/0°/90°/0°/90°, followed by layering one sheet of the cloth prepreg thereon (on 0° layer) to prepare a prepreg layered composite.

A mold of 220×220 mm was heated to 130° C. Since a packing piece made of butyl rubber in size of 10 mm width and 3 mm thickness are placed in L shape onto two edges within four edges thereof, the usable face of the mold was 210×210 mm.

Previously prepared prepreg layered composite was placed on the usable face of the mold in 5 mm respectively apart from the mold edges and the butyl rubber packing. Then, the mold was instantly fastened, followed by being subjected to pressure of 10 kg/cm$^2$ for 15 minutes to obtain an FRP plate.

3 sample pieces of 30×30 mm were optionally cut out from the FRP plate, followed by obtaining a volume content of carbon fiber (Archimedes method); the results was 60.6% by volume on average. The resin content was 30.9% by weight which was calculated using the values of matrix resin density of 1.25 and carbon fiber average density of 1.82.

Although unevenness caused by defects on the mold surface were found here and there on the FRP plate obtained, the center line average roughness on the part having no unevenness was measured by the method and the device described in the detailed description; the measurement result was 0.27 µm.

As described above, it has been proved that the embodiment can provide an FRP plate suitably used as shell plates for transport machinery and industrial apparatuses, and a prepreg suitably used to obtain the FRP.

Examples of the Fourth Embodiment

The fourth embodiment is described in detail referring to Examples as follows. The embodiment should not be limited to the following examples.

Example 52

In order to keep the inside of a mold airtight, the share edge structure (refer to the FIG. 2) was employed at the part where upper mold and lower mold come into contact when the mold is fastened, wherein surface area excluding the thickness part of the FRP part of the lower mold was 900 cm$^2$; both of the upper and lower molds were heated to 140° C.

To prepare a molding material, a prepreg sheet TR390E125S (manufactured by MITSUBISHI RAYON CO., LTD.), in which the prepreg sheet was impregnated with an epoxy resin composition in a unidirectional carbon fiber, was cut in a size of 285×285 mm; and then 18 leaves of the cut sheets were layered in a manner of an aligned fiber direction of each sheet being alternatively 0° or 90° one after the other; the resultant layer having a thickness of 2 mm, total volume of 162 cm$^3$ and one side surface area of 812 cm$^2$. $S_1/S_2$ thereof was 812/900=0.9. The epoxy resin used for the prepreg sheet TR390E125S was an epoxy resin composition corresponding to the epoxy resin composition of the first embodiment produced by the following method. "Mixture of Ep828 and DDS (92:8 by mass ratio) was reacted at 150° C. to obtain a resin composition, followed by the addition of 100 parts by mass of the resultant resin composition with 15 parts by mass of Ep828, 6 parts by mass of PDMU and 9 parts by mass of dicyandiamide, and then mixed to be uniform to obtain an epoxy resin composition."

The molding material described above was set on the lower mold, just followed by pulling down the upper mold to fasten the mold and being subjected to pressure of 9.8×10$^2$ kPa for 10 minutes; thereafter, the mold was opened to strip off a finished molding (thickness of 1.6 mm, volume of 144 cm$^3$) by an equipped ejector pin while keeping a mold temperature at 140° C. The finished molding had no pin hole or void on any of the front and back faces, and section, and was excellent in appearance.

Example 53

As the molding material, employed was a molding material (total thickness of 4 mm, total volume of 325 cm$^3$) which adhered to the molding material used in the Example 1 and a carbon fiber contained epoxy resin SMC Lytex4149 (manufactured by QUANTUM COMPOSITES) (one side surface excluding the thickness part being 812 cm$^2$). $S_1/S_2$ thereof was 0.9.

The molding material described above was set on the lower mold, just followed by pulling down the upper mold to fasten the mold and being subjected to pressure of 3.0×10$^3$ kPa for 10 minutes; thereafter, the mold was opened to strip off a finished molding (thickness of 3.2 mm, volume of 288 cm$^3$) by an equipped ejector pin while keeping the mold temperature at 140° C. The finished molding was a product at a level having no problems on the surface, appearance and in physical property.

As described above, it has been proved that the method for producing the FRP of the embodiment can obtain an FRP which includes substantially continuous reinforced fiber, and having high strength and excellent design, while employing a compression molding method which is suitable to mass production.

Comparative Example 17

Except for using, as the molding material, a layered material which was formed by cutting a prepreg sheet TR390E125S (manufactured by MITSUBISHI RAYON CO., LTD.) in a size of 250×250 mm, which was impregnated with an epoxy resin in an unidirectional carbon fiber, and then layering 24 leaves of the cut sheets in a manner of aligned fiber direction of each sheet being alternatively 0° or 90° one after the other, the resultant layer having a thickness of 2.6 mm, total volume of 162 cm$^3$ and one side surface area of 625 cm$^2$; molding was carried out under the same conditions of Example 1. $S_1/S_2$ thereof was 625/900=0.7.

The finished molding had severe disturbance of fiber alignment, especially at the outer circumference, due to flow of resin during the molding processing.

Comparative Example 18

Except using, as the molding material, a layered material which was formed by cutting a prepreg sheet TR390E125S (manufactured by MITSUBISHI RAYON CO., LTD.) in a size of 320×320 mm, which was impregnated with an epoxy resin in a unidirectional carbon fiber, and then layering 14 leaves of the cut sheets in a manner of aligned fiber direction of each sheet being alternatively 0° or 90° one after the other, the resultant layer having a thickness of 1.6 mm, total volume of 162 cm$^3$ and one side surface area of 1024 cm$^2$; molding was carried out in the same conditions of the Example 1. $S_1/S_2$ thereof was 1024/900=1.1.

Since reinforced fibers constituting the molding material run over the mold, disturbance of fiber alignment was caused by drawn fibers. Consequently, the finished molding obtained had an undesirable appearance, and the surface thereof was not smooth.

INDUSTRIAL APPLICABILITY

The present invention can provide quantitative index, and easily provides a superior prepreg which is possible to cure in a short time at a relatively low temperature, being excellent in mechanical property and being possible to preserve for a long period at room temperature, and an FRP which is light in weight, high in strength and high in rigidity. These are widely applicable from sports and leisure applications to industrial applications such as automobiles, aircraft and the like.

The invention claimed is:

1. A method for producing a fiber-reinforced composite material molding comprising:
    (1) preliminarily adjusting a temperature of a mold to be equal to or more than the curing temperature of a thermosetting resin;
    (2) preparing a molding material wherein (A) a substantially continuous reinforced fiber is impregnated with the thermosetting resin, and a volume of the molding material is more than 100% and equal to or less than 120% of a volume of a finished molding, and a thickness of the molding material is more than 100% and equal to and less than 150% of a thickness of a finished molding;
    (3) putting the molding material in the temperature-adjusted mold which has one side surface area $S_2$, wherein the molding material has one side surface area $S_1$ and $S_1/S_2$ is 0.8 to 1;
    (4) fastening the mold following (3) and such that the whole inside of the mold is filled with the molding material; and
    (5) compression molding to obtain a finished molding, wherein the prepared molding material additionally comprises (B) a material impregnated with a thermosetting resin in a staple reinforced fiber wherein component (B) is laminated on at least one surface of component (A).

2. The method for producing a fiber-reinforced composite material molding according to claim 1, wherein the mold is subjected to degassing by using a degassing mechanism when the whole inside of the mold is filled with the molding material after the mold is fastened.

3. The method for producing a fiber-reinforced composite material molding according to claim 1, wherein the fiber-reinforced composite material molding is stripped off free from decreasing the temperature of the mold.

4. The method for producing a fiber-reinforced composite material molding according to claim 1, which employs as the mold a mold having a mechanism to strip the fiber-reinforced composite material molding therefrom.

5. The method for producing a fiber-reinforced composite material molding according to claim 1, wherein the thermosetting resin is an epoxy resin composition.

6. The method for producing a fiber-reinforced composite material molding according to claim 1, wherein the reinforced fiber is a carbon fiber.

* * * * *